United States Patent
Gao et al.

(10) Patent No.: US 7,323,431 B2
(45) Date of Patent: Jan. 29, 2008

(54) CATALYST FOR OLEFIN POLYMERIZATION AND USE OF THE SAME

(75) Inventors: Mingzhi Gao, Beijing (CN); Lunjia Xie, Beijing (CN); Xiaodong Wang, Beijing (CN); Siyuan Zhao, Beijing (CN); Jing Ma, Beijing (CN); Haitao Liu, Beijing (CN); Tianyi Li, Beijing (CN); Zhufang Sun, Beijing (CN)

(73) Assignees: China Petroleum & Chemical Corporation, Beijing (CN); Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 0 days.

(21) Appl. No.: 11/021,542

(22) Filed: Dec. 23, 2004

(65) Prior Publication Data

US 2006/0142146 A1    Jun. 29, 2006

(51) Int. Cl.
*B01J 31/00* (2006.01)
*B01J 37/00* (2006.01)
*C08F 4/02* (2006.01)
*C08F 4/60* (2006.01)

(52) U.S. Cl. .................. 502/150; 502/103; 502/125; 502/126

(58) Field of Classification Search ............ 502/103, 502/125, 126
See application file for complete search history.

(56) References Cited

U.S. PATENT DOCUMENTS

| | | | | |
|---|---|---|---|---|
| 4,829,034 A | * | 5/1989 | Iiskolan et al. | 502/9 |
| 5,254,645 A | * | 10/1993 | King et al. | 525/479 |
| 5,905,050 A | * | 5/1999 | Koshinen et al. | 502/9 |
| 6,624,110 B2 | * | 9/2003 | Debras et al. | 502/226 |
| 6,822,109 B2 | * | 11/2004 | Xie et al. | 556/482 |
| 7,033,970 B2 | * | 4/2006 | Vitale et al. | 502/126 |
| 2004/0235643 A1 | * | 11/2004 | Vitale et al. | 502/102 |
| 2004/0235645 A1 | * | 11/2004 | Morini et al. | 502/103 |

FOREIGN PATENT DOCUMENTS

| | | |
|---|---|---|
| CN | 1182748 | 5/1998 |
| CN | 1542014 | 11/2004 |
| CN | 1583805 | 2/2005 |
| JP | 6-145235 | 5/1994 |
| JP | 06-145235 | * 5/1994 |
| JP | 11-80235 | 3/1999 |

OTHER PUBLICATIONS

International Search Report for International Applcation No. PCT/CN2004/001506.

* cited by examiner

*Primary Examiner*—J. A. Lorengo
*Assistant Examiner*—Patricia L. Hailey
(74) *Attorney, Agent, or Firm*—Ladas & Parry LLP

(57) ABSTRACT

The present application discloses a catalyst for olefin polymerization, comprising a product of the following components: (A) solid titanium-containing catalyst component comprising magnesium, titanium and halogen as essential components; (B) organo-aluminum compound catalyst component, and (C) silicon ether compound catalyst component, the silicon ether compound being represented by a general formula (I):

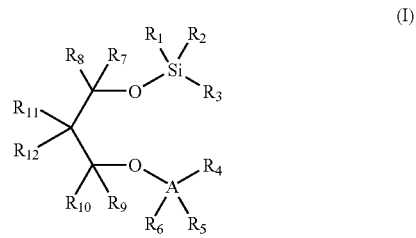

wherein
$R_1$-$R_{12}$ and A are as defined in the description.

16 Claims, No Drawings

CATALYST FOR OLEFIN POLYMERIZATION AND USE OF THE SAME

TECHNICAL FIELD

The present invention relates to a catalyst for olefin polymerization, in particular, to a catalyst comprising silicon ether compounds having a novel structure, and to use of the catalyst in olefin polymerization, especially in propylene polymerization. The catalyst system exhibits good hydrogen responsibility, and can be used to prepare polymer having high isotacticity at high yield.

BACKGROUND ART

Catalysts for olefin polymerization or copolymerization are well known in the literatures. These catalysts typically comprise a transition metal-containing active component, generally comprising magnesium, titanium and halogen as main ingredients; a cocatalyst component, typically organo-aluminium compound; and external electron donor component, typically organo-silicon compound. For stereoelective polymerization of olefin, especially stereoelective polymerization of propylene, if no external electron donor component is used, most of these catalysts give a polymer having lower isotacticity, typically lower than 90%, so that they are not applicable to industrial scale production. Therefore, the addition of external electron donor component is often necessary.

At preset, the types of external electron donor compounds have developed from initial benzoates to current organosiloxane. For instance, WO 00/63261 discloses external electron donor compounds useful in olefin polymerization, i.e. silicon compounds having a general formula $R^{11}{}_aR^{12}{}_bSi(OR^{13})_c$, wherein a and b are integer from 0 to 2, c is integer from 1 to 3, and the sum of a+b+c is 4, $R^{11}$, $R^{12}$ and $R^{13}$ are independently $C_1$-$C_{18}$ hydrocarbyl which optionally contains heteroatom. The preferred are those silicon compounds in which a is 1, b is 1, c is 2, at least one of $R^{11}$ and $R^{12}$ are selected from the group consisting of branched alkyl, alkenyl, alkylene, cycloalkyl and aryl, having from 3 to 10 carbon atoms and containing optionally heteroatom, and $R^{13}$ is $C_1$-$C_{10}$ alkyl, especially methyl, for example, cyclohexylmethyldimethoxysilane. The also preferred are those silicon compounds in which a is 0, b is 1, c is 3, $R^{12}$ is branched alkyl or cycloalkyl, containing optionally heteroatom, and $R^{13}$ is methyl, for example, cyclohexyltrimethoxysilane and the like.

It is noted that, among the silicon compounds having the general formula $R^{11}{}_aR^{12}{}_bSi(OR^{13})_c$, those silicon compounds wherein c is 1 are generally not deemed as good external electron donor compound. In the prior art, γ-trihydrocarbylsilyloxy ether compounds have never been used as external electron donor compounds in olefin polymerization. However, the inventors have surprisingly found that, when used as external electron donor compounds in olefin polymerization, especially in propylene polymerization, γ-trihydrocarbylsilyloxy-ether or -silicon ether compounds exhibit good properties, for instance, the catalyst system exhibits good hydrogen responsibility, and can be used to prepare polymer having high isotacticity at high yield.

DESCRIPTION THE INVENTION

One object of the invention is to provide a catalyst for olefin polymerization, comprising a product of the following components:

(A) solid titanium-containing catalyst component comprising magnesium, titanium and halogen as essential components;
(B) organo-aluminum compound catalyst component, and
(C) silicon ether compound catalyst component, the silicon ether compound being represented by a general formula (I):

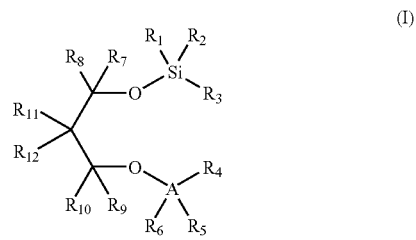

wherein
$R_1$-$R_{12}$ groups, which are identical to or different from each other, represent hydrogen, halogen, $C_1$-$C_{20}$ linear or branched alkyl, $C_3$-$C_{20}$ cycloalkyl, $C_6$-$C_{20}$ aryl, $C_7$-$C_{20}$ alkaryl or $C_7$-$C_{20}$ aralkyl, and two or more of $R_1$-$R_{12}$ groups can be linked to form saturated or unsaturated ring structure(s), which is/are optionally substituted by a group having the same meanings as that of $R_1$-$R_{12}$ groups; $R_1$-$R_{12}$ groups optionally contain one or more heteroatoms selected from the group consisting of nitrogen, oxygen, sulfur, silicon, phosphorus and halogen atom for replacing carbon atom(s), hydrogen atom(s) or the both; and A represents carbon atom or silicon atom.

In the above general formula (I), it is preferable that $R_1$-$R_{10}$ groups, which are identical to or different from each other, represent hydrogen, halogen, $C_1$-$C_{10}$ linear or branched alkyl, or $C_6$-$C_{10}$ aryl.

In a preferred embodiment of the invention, A represents carbon atom, $R_1$-$R_3$, which are identical to or different from each other, represent methyl, ethyl, n-propyl, iso-propyl, n-butyl, tert-butyl or phenyl, $R_4$-$R_6$, which are identical to or different from each other, represent hydrogen, methyl, ethyl, n-propyl, iso-propyl, n-butyl, or tert-butyl, and $R_7$-$R_{10}$ represent hydrogen. More preferably, $R_1$ and $R_2$ are methyl, $R_3$ is methyl or tert-butyl, and $R_4$-$R_{10}$ represent hydrogen.

In another preferred embodiment of the invention, A represents silicon atom, $R_1$-$R_6$, which are identical to or different from each other, represent methyl, ethyl, n-propyl, iso-propyl, n-butyl, tert-butyl or phenyl, and $R_7$-$R_{10}$ are hydrogen, more preferably, $R_1$, $R_2$, $R_4$, and $R_5$ are methyl, and $R_3$ and $R_6$ are independently methyl or tert-butyl.

According to one embodiment of the invention, $R_{11}$ and $R_{12}$ in above formula (I) represent independently $C_1$-$C_{20}$ linear or branched alkyl, $C_6$-$C_{20}$ aryl, $C_7$-$C_{20}$ alkaryl or $C_7$-$C_{20}$ aralkyl group, and $R_{11}$ and $R_{12}$ may be linked together to form a saturated ring system.

Examples of the silicon ether compound according to this embodiment of the innovation include, but are not limited to 2,2-dimethyl-1-methoxy-3-[(trimethylsilyl)oxy]propane;
2,2-dimethyl-1-methoxy-3-[(triethylsilyl)oxy]propane;
2,2-dimethyl-1-methoxy-3-[(triphenylsilyl)oxy]propane;
2,2-dimethyl-1-methoxy-3-[(ethyldimethylsilyl)oxy]propane;
2,2-dimethyl-1-methoxy-3-[(dimethylpropylsilyl)oxy]propane;
2,2-dimethyl-1-methoxy-3-[(tert-butyldimethylsilyl)oxy]propane;

2,2-dimethyl-1-methoxy-3-[(n-butyldimethylsilyl)oxy]propane;
2,2-dimethyl-1-methoxy-3-[(benzyldimethylsilyl)oxy]propane;
2,2-dimethyl-1-methoxy-3-[(dimethylphenethylsilyl)oxy]propane;
2,2-dimethyl-1-methoxy-3-[(dimethylphenylsilyl)oxy]propane;
2,2-dimethyl-1-methoxy-3-[(dimethyltolylsilyl)oxy]propane;
2,2-dimethyl-1-ethoxy-3-[(trimethylsilyl)oxy]propane;
2,2-dimethyl-1-ethoxy-3-[(triethylsilyl)oxy]propane;
2,2-dimethyl-1-ethoxy-3-[(triphenylsilyl)oxy]propane;
2,2-dimethyl-1-ethoxy-3-[(ethyldimethylsilyl)oxy]propane;
2,2-dimethyl-1-ethoxy-3-[(dimethylpropylsilyl)oxy]propane;
2,2-dimethyl-1-ethoxy-3-[(tert-butyldimethylsilyl)oxy]propane;
2,2-dimethyl-1-ethoxy-3-[(n-butyldimethylsilyl)oxy]propane;
2,2-dimethyl-1-ethoxy-3-[(benzyldimethylsilyl)oxy]propane;
2,2-dimethyl-1-ethoxy-3-[(dimethylphenethylsilyl)oxy]propane;
2,2-dimethyl-1-ethoxy-3-[(dimethylphenylsilyl)oxy]propane;
2,2-dimethyl-1-ethoxy-3-[(dimethyltolylsilyl)oxy]propane;
2,2-dimethyl-1-propoxy-3-[(trimethylsilyl)oxy]propane;
2,2-dimethyl-1-propoxy-3-[(triethylsilyl)oxy]propane;
2,2-dimethyl-1-propoxy-3-[(triphenylsilyl)oxy]propane;
2,2-dimethyl-1-propoxy-3-[(ethyldimethylsilyl)oxy]propane;
2,2-dimethyl-1-propoxy-3-[(dimethylpropylsilyl)oxy]propane;
2,2-dimethyl-1-propoxy-3-[(tert-butyldimethylsilyl)oxy]propane;
2,2-dimethyl-1-propoxy-3-[(n-butyldimethylsilyl)oxy]propane;
2,2-dimethyl-1-propoxy-3-[(benzyldimethylsilyl)oxy]propane;
2,2-dimethyl-1-propoxy-3-[(dimethylphenethylsilyl)oxy]propane;
2,2-dimethyl-1-propoxy-3-[(dimethylphenylsilyl)oxy]propane;
2,2-dimethyl-1-propoxy-3-[(dimethyltolylsilyl)oxy]propane;
2,2-di-n-propyl-1-methoxy-3-[(trimethylsilyl)oxy]propane;
2,2-di-n-butyl-1-methoxy-3-[(trimethylsilyl)oxy]propane;
2,2-di-n-butyl-1-methoxy-3-[(triethylsilyl)oxy]propane;
2,2-di-n-butyl-1-methoxy-3-[(triphenylsilyl)oxy]propane;
2,2-di-n-butyl-1-methoxy-3-[(ethyldimethylsilyl)oxy]propane;
2,2-di-n-butyl-1-methoxy-3-[(dimethylpropylsilyl)oxy]propane;
2,2-di-n-butyl-1-methoxy-3-[(tert-butyldimethylsilyl)oxy]propane;
2,2-di-n-butyl-1-methoxy-3-[(n-butyldimethylsilyl)oxy]propane;
2,2-di-n-butyl-1-methoxy-3-[(benzyldimethylsilyl)oxy]propane;
2,2-di-n-butyl-1-methoxy-3-[(dimethylphenethylsilyl)oxy]propane;
2,2-di-n-butyl-1-methoxy-3-[(dimethylphenylsilyl)oxy]propane;
2,2-di-n-butyl-1-methoxy-3-[(dimethyltolylsilyl)oxy]propane;
2,2-di-iso-butyl-1-methoxy-3-[(trimethylsilyl)oxy]propane;
2,2-di-iso-butyl-1-methoxy-3-[(triethylsilyl)oxy]propane;
2,2-di-iso-butyl-1-methoxy-3-[(triphenylsilyl)oxy]propane;
2,2-di-iso-butyl-1-methoxy-3-[(ethyldimethylsilyl)oxy]propane;
2,2-di-iso-butyl-1-methoxy-3-[(dimethylpropylsilyl)oxy]propane;
2,2-di-iso-butyl-1-methoxy-3-[(tert-butyldimethylsilyl)oxy]propane;
2,2-di-iso-butyl-1-methoxy-3-[(n-butyldimethylsilyl)oxy]propane;
2,2-di-iso-butyl-1-methoxy-3-[(benzyldimethylsilyl)oxy]propane;
2,2-di-iso-butyl-1-methoxy-3-[(dimethylphenethylsilyl)oxy]propane;
2,2-di-iso-butyl-1-methoxy-3-[(dimethylphenylsilyl)oxy]propane;
2,2-di-iso-butyl-1-methoxy-3-[(dimethyltolylsilyl)oxy]propane;
2,2-di-iso-butyl-1-ethoxy-3-[(trimethylsilyl)oxy]propane;
2,2-di-iso-butyl-1-ethoxy-3-[(triethylsilyl)oxy]propane;
2,2-di-iso-butyl-1-ethoxy-3-[(triphenylsilyl)oxy]propane;
2,2-di-iso-butyl-1-ethoxy-3-[(ethyldimethylsilyl)oxy]propane;
2,2-di-iso-butyl-1-ethoxy-3-[(dimethylpropylsilyl)oxy]propane;
2,2-di-iso-butyl-1-ethoxy-3-[(tert-butyldimethylsilyl)oxy]propane;
2,2-di-iso-butyl-1-ethoxy-3-[(n-butyldimethylsilyl)oxy]propane;
2,2-di-iso-butyl-1-ethoxy-3-[(benzyldimethylsilyl)oxy]propane;
2,2-di-iso-butyl-1-ethoxy-3-[(dimethylphenethylsilyl)oxy]propane;
2,2-di-iso-butyl-1-ethoxy-3-[(dimethylphenylsilyl)oxy]propane;
2,2-di-iso-butyl-1-ethoxy-3-[(dimethyltolylsilyl)oxy]propane;
2,2-di-iso-butyl-1-propoxy-3-[(trimethylsilyl)oxy]propane;
2,2-di-iso-butyl-1-propoxy-3-[(triethylsilyl)oxy]propane;
2,2-di-iso-butyl-1-propoxy-3-[(triphenylsilyl)oxy]propane;
2,2-di-iso-butyl-1-propoxy-3-[(ethyldimethylsilyl)oxy]propane;
2,2-di-iso-butyl-1-propoxy-3-[(dimethylpropylsilyl)oxy]propane;
2,2-di-iso-butyl-1-propoxy-3-[(tert-butyldimethylsilyl)oxy]propane;
2,2-di-iso-butyl-1-propoxy-3-[(n-butyldimethylsilyl)oxy]propane;
2,2-di-iso-butyl-1-propoxy-3-[(benzyldimethylsilyl)oxy]propane;
2,2-di-iso-butyl-1-propoxy-3-[(dimethylphenethylsilyl)oxy]propane;
2,2-di-iso-butyl-1-propoxy-3-[(dimethylphenylsilyl)oxy]propane;
2,2-di-iso-butyl-1-propoxy-3-[(dimethyltolylsilyl)oxy]propane;

2,2-dibenzyl-1-methoxy-3-[(trimethylsilyl)oxy]propane;
2,2-dibenzyl-1-methoxy-3-[(triethylsilyl)oxy]propane;
2,2-dibenzyl-1-methoxy-3-[(triphenylsilyl)oxy]propane;
2,2-dibenzyl-1-methoxy-3-[(ethyldimethylsilyl)oxy]propane;
2,2-dibenzyl-1-methoxy-3-[(dimethylpropylsilyl)oxy]propane;
2,2-dibenzyl-1-methoxy-3-[(tert-butyldimethylsilyl)oxy]propane;
2,2-dibenzyl-1-methoxy-3-[(n-butyldimethylsilyl)oxy]propane;
2,2-dibenzyl-1-methoxy-3-[(benzyldimethylsilyl)oxy]propane;
2,2-dibenzyl-1-methoxy-3-[(dimethylphenethylsilyl)oxy]propane;
2,2-dibenzyl-1-methoxy-3-[(dimethylphenylsilyl)oxy]propane;
2,2-dibenzyl-1-methoxy-3-[(dimethyltolylsilyl)oxy]propane;
2,2-dibenzyl-1-ethoxy-3-[(trimethylsilyl)oxy]propane;
2,2-dibenzyl-1-ethoxy-3-[(triethylsilyl)oxy]propane;
2,2-dibenzyl-1-ethoxy-3-[(triphenylsilyl)oxy]propane;
2,2-dibenzyl-1-ethoxy-3-[(ethyldimethylsilyl)oxy]propane;
2,2-dibenzyl-1-ethoxy-3-[(dimethylpropylsilyl)oxy]propane;
2,2-dibenzyl-1-ethoxy-3-[(tert-butyldimethylsilyl)oxy]propane;
2,2-dibenzyl-1-ethoxy-3-[(n-butyldimethylsilyl)oxy]propane;
2,2-dibenzyl-1-ethoxy-3-[(benzyldimethylsilyl)oxy]propane;
2,2-dibenzyl-1-ethoxy-3-[(dimethylphenethylsilyl)oxy]propane;
2,2-dibenzyl-1-ethoxy-3-[(dimethylphenylsilyl)oxy]propane;
2,2-dibenzyl-1-ethoxy-3-[(dimethyltolylsilyl)oxy]propane;
2,2-dibenzyl-1-propoxy-3-[(trimethylsilyl)oxy]propane;
2,2-dibenzyl-1-propoxy-3-[(triethylsilyl)oxy]propane;
2,2-dibenzyl-1-propoxy-3-[(triphenylsilyl)oxy]propane;
2,2-dibenzyl-1-propoxy-3-[(ethyldimethylsilyl)oxy]propane;
2,2-dibenzyl-1-propoxy-3-[(dimethylpropylsilyl)oxy]propane;
2,2-dibenzyl-1-propoxy-3-[(tert-butyldimethylsilyl)oxy]propane;
2,2-dibenzyl-1-propoxy-3-[(n-butyldimethylsilyl)oxy]propane;
2,2-dibenzyl-1-propoxy-3-[(benzyldimethylsilyl)oxy]propane;
2,2-dibenzyl-1-propoxy-3-[(dimethylphenethylsilyl)oxy]propane;
2,2-dibenzyl-1-propoxy-3-[(dimethylphenylsilyl)oxy]propane;
2,2-dibenzyl-1-propoxy-3-[(dimethyltolylsilyl)oxy]propane;
2,2-dimethyl-1,3-bis[(trimethylsilyl)oxy]propane;
2,2-dimethyl-1,3-bis[(triethylsilyl)oxy]propane;
2,2-dimethyl-1,3-bis[(triphenylsilyl)oxy]propane;
2,2-dimethyl-1,3-bis[(ethyldimethylsilyl)oxy]propane;
2,2-dimethyl-1,3-bis[(dimethylpropylsilyl)oxy]propane;
2,2-dimethyl-1,3-bis[(tert-butyldimethylsilyl)oxy]propane;
2,2-dimethyl-1,3-bis[(n-butyldimethylsilyl)oxy]propane;
2,2-dimethyl-1,3-bis[(benzyldimethylsilyl)oxy]propane;
2,2-dimethyl-1,3-bis[(dimethylphenethylsilyl)oxy]propane;
2,2-dimethyl-1,3-bis[(dimethylphenylsilyl)oxy]propane;
2,2-dimethyl-1,3-bis[(dimethyltolylsilyl)oxy]propane;
2,2-di-n-butyl-1,3-bis[(trimethylsilyl)oxy]propane;
2,2-di-n-propyl-1,3-bis[(trimethylsilyl)oxy]propane;
1,1-bis[(trimethylsilyl)oxymethyl]cyclohexane;
1,1-bis[(trimethylsilyl)oxymethyl]cyclopentane;
2,2-di-iso-butyl-1,3-bis[(trimethylsilyl)oxy]propane;
2,2-di-iso-butyl-1,3-bis[(triethylsilyl)oxy]propane;
2,2-di-iso-butyl-1,3-bis[(triphenylsilyl)oxy]propane;
2,2-di-iso-butyl-1,3-bis[(ethyldimethylsilyl)oxy]propane;
2,2-di-iso-butyl-1,3-bis[(dimethylpropylsilyl)oxy]propane;
2,2-di-iso-butyl-1,3-bis[(tert-butyldimethylsilyl)oxy]propane;
2,2-di-iso-butyl-1,3-bis[(n-butyldimethylsilyl)oxy]propane;
2,2-di-iso-butyl-1,3-bis[(benzyldimethylsilyl)oxy]propane;
2,2-di-iso-butyl-1,3-bis[(dimethylphenethylsilyl)oxy]propane;
2,2-di-iso-butyl-1,3-bis[(dimethylphenylsilyl)oxy]propane;
2,2-di-iso-butyl-1,3-bis[(dimethyltolylsilyl)oxy]propane;
2,2-dibenzyl-1,3-bis[(trimethylsilyl)oxy]propane;
2,2-dibenzyl-1,3-bis[(triethylsilyl)oxy]propane;
2,2-dibenzyl-1,3-bis[(triphenylsilyl)oxy]propane;
2,2-dibenzyl-1,3-bis[(ethyldimethylsilyl)oxy]propane;
2,2-dibenzyl-1,3-bis[(dimethylpropylsilyl)oxy]propane;
2,2-dibenzyl-1,3-bis[(tert-butyldimethylsilyl)oxy]propane;
2,2-dibenzyl-1,3-bis[(n-butyldimethylsilyl)oxy]propane;
2,2-dibenzyl-1,3-bis[(benzyldimethylsilyl)oxy]propane;
2,2-dibenzyl-1,3-bis[(dimethylphenethylsilyl)oxy]propane;
2,2-dibenzyl-1,3-bis[(dimethylphenylsilyl)oxy]propane;
2,2-dibenzyl-1,3-bis[(dimethyltolylsilyl)oxy]propane.

According to another embodiment of the invention, the silicon ether compound has a general formula (II):

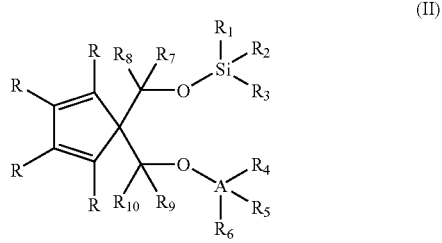

(II)

wherein
R and $R_1$-$R_{10}$ groups, which are identical to or different from each other, represent hydrogen, halogen, $C_1$-$C_{20}$ linear or branched alkyl, $C_3$-$C_{20}$ cycloalkyl, $C_6$-$C_{20}$ aryl, $C_7$-$C_{20}$ alkaryl or $C_7$-$C_{20}$ aralkyl, and two or more of R groups can be linked to form saturated or unsaturated condensed ring structure(s), which is/are optionally substituted by a group having the same meanings as that of $R_1$-$R_{10}$ groups; R and $R_1$-$R_{10}$ groups optionally contain one or more hetero-atoms selected from the group consisting of nitrogen, oxygen, sulfur, silicon, phosphorus and halogen atom for replacing carbon atom(s), hydrogen atom(s) or the both; and A represents carbon atom or silicon atom.

According to a preferred embodiment of the invention, the silicon ether compound has a general formula (III):

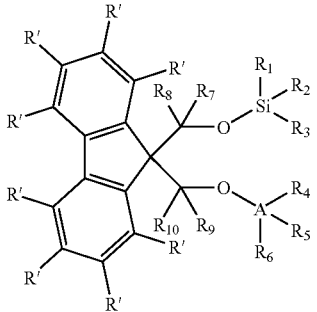

(III)

wherein, $R_1$-$R_{10}$ groups and A have the meanings as defined in formula (I), and R's, which are identical to or different from each other, represent hydrogen, halogen, $C_1$-$C_{20}$ linear or branched alkyl, $C_3$-$C_{20}$ cycloalkyl, $C_6$-$C_{20}$ aryl, $C_7$-$C_{20}$ alkaryl or $C_7$-$C_{20}$ aralkyl group.

In the above general formulae (II) and (III), it is preferred that $R_1$-$R_{10}$ groups are identical to or different from each other, and represent hydrogen, halogen, $C_1$-$C_{10}$ linear or branched alkyl, or $C_6$-$C_{10}$ aryl.

In the above general formulae (II) and (III), it is preferred that A represents carbon atom, and $R_1$-$R_3$, which are identical to or different from each other, represent methyl, ethyl, n-propyl, iso-propyl, n-butyl, tert-butyl or phenyl, and $R_4$-$R_6$, which are identical to or different from each other, represent hydrogen, methyl, ethyl, n-propyl, iso-propyl, n-butyl, or tert-butyl; more preferably, $R_1$ and $R_2$ are methyl, $R_3$ is methyl or tert-butyl, and $R_4$-$R_{10}$ and R' represent hydrogen.

In the above general formulae (II) and (III), it is also preferred that A represents silicon atom, and $R_1$-$R_6$, which are identical to or different from each other, represent methyl, ethyl, n-propyl, iso-propyl, n-butyl, tert-butyl or phenyl; more preferably, $R_1$, $R_2$, $R_4$, and $R_5$ are methyl, $R_3$ and $R_6$ are independently methyl or tert-butyl, and $R_7$-$R_{10}$ and R' represent hydrogen.

Examples of the silicon ether compound of formula (II) or (III) include, but are not limited to, 9-(methoxymethyl)-9-[(trimethylsilyl)oxymethyl]fluorene;
9-(methoxymethyl)-9-[(triethylsilyl)oxymethyl]fluorene;
9-(methoxymethyl)-9-[(triphenylsilyl)oxymethyl]fluorene;
9-(methoxymethyl)-9-[(ethyldimethylsilyl)oxymethyl]fluorene;
9-(methoxymethyl)-9-[(dimethylpropylsilyl)oxymethyl]fluorene;
9-(methoxymethyl)-9-[(tert-butyldimethylsilyl)oxymethyl]fluorene;
9-(methoxymethyl)-9-[(n-butyldimethylsilyl)oxymethyl]fluorene;
9-(methoxymethyl)-9-[(benzyldimethylsilyl)oxymethyl]fluorene;
9-(methoxymethyl)-9-(dimethylphenethylsilyl)oxymethyl]fluorene;
9-(methoxymethyl)-9-[(dimethylphenylsilyl)oxymethyl]fluorene;
9-(methoxymethyl)-9-[(dimethyltolylsilyl)oxymethyl]fluorene;
9-(ethoxymethyl)-9-[(trimethylsilyl)oxymethyl]fluorene;
9-(ethoxymethyl)-9-[(triethylsilyl)oxymethyl]fluorene;
9-(ethoxymethyl)-9-[(triphenylsilyl)oxymethyl]fluorene;
9-(ethoxymethyl)-9-[(ethyldimethylsilyl)oxymethyl]fluorene;
9-(ethoxymethyl)-9-[(dimethylpropylsilyl)oxymethyl]fluorene;
9-(ethoxymethyl)-9-[(tert-butyldimethylsilyl)oxymethyl]fluorene;
9-(ethoxymethyl)-9-[(n-butyldimethylsilyl)oxymethyl]fluorene;
9-(ethoxymethyl)-9-[(benzyldimethylsilyl)oxymethyl]fluorene;
9-(ethoxymethyl)-9-[(dimethylphenethylsilyl)oxymethyl]fluorene;
9-(ethoxymethyl)-9-[(dimethylphenylsilyl)oxymethyl]fluorene;
9-(ethoxymethyl)-9-[(dimethyltolylsilyl)oxymethyl]fluorene;
9-(n-propoxymethyl)-9-[(trimethylsilyl)oxymethyl]fluorene;
9-(n-propoxymethyl)-9-[(triethylsilyl)oxymethyl]fluorene;
9-(n-propoxymethyl)-9-[(triphenylsilyl)oxymethyl]fluorene;
9-(n-propoxymethyl)-9-[(ethyldimethylsilyl)oxymethyl]fluorene;
9-(n-propoxymethyl)-9-[(dimethylpropylsilyl)oxymethyl]fluorene;
9-(n-propoxymethyl)-9-[(tert-butyldimethylsilyl)oxymethyl]fluorene;
9-(n-propoxymethyl)-9-[(n-butyldimethylsilyl)oxymethyl]fluorene;
9-(n-propoxymethyl)-9-[(benzyldimethylsilyl)oxymethyl]fluorene;
9-(n-propoxymethyl)-9-[(dimethylphenethylsilyl)oxymethyl]fluorene;
9-(n-propoxymethyl)-9-[(dimethylphenylsilyl)oxymethyl]fluorene;
9-(n-propoxymethyl)-9-[(dimethyltolylsilyl)oxymethyl]fluorene;
9,9-bis[(trimethylsilyl)oxymethyl]fluorene;
9,9-bis[(triethylsilyl)oxymethyl]fluorene;
9,9-bis[(triphenylsilyl)oxymethyl]fluorene;
9,9-bis[(ethyldimethylsilyl)oxymethyl]fluorene;
9,9-bis[(dimethylpropylsilyl)oxymethyl]fluorene;
9,9-bis[(tert-butyldimethylsilyl)oxymethyl]fluorene;
9,9-bis[(n-butyldimethylsilyl)oxymethyl]fluorene;
9,9-bis[(benzyldimethylsilyl)oxymethyl]fluorene;
9,9-bis[(dimethylphenethylsilyl)oxymethyl]fluorene;
9,9-bis[(dimethylphenylsilyl)oxymethyl]fluorene;
9,9-bis[(dimethyltolylsilyl)oxymethyl]fluorene;
2-fluoro-9,9-bis[(trimethylsilyl)oxymethyl]fluorene;
2-fluoro-9,9-bis[(triethylsilyl)oxymethyl]fluorene;
2-fluoro-9,9-bis[(triphenylsilyl)oxymethyl]fluorene;
2-fluoro-9,9-bis[(ethyldimethylsilyl)oxymethyl]fluorene;
2-fluoro-9,9-bis[(dimethylpropylsilyl)oxymethyl]fluorene;
2-fluoro-9,9-bis[(tert-butyldimethylsilyl)oxymethyl]fluorene;
2-fluoro-9,9-bis[(n-butyldimethylsilyl)oxymethyl]fluorene;
2-fluoro-9,9-bis[(benzyldimethylsilyl)oxymethyl]fluorene;
2-fluoro-9,9-bis[(dimethylphenethylsilyl)oxymethyl]fluorene;

2-fluoro-9,9-bis[(dimethylphenylsilyl)oxymethyl]fluorine;

2-fluoro-9,9-bis[(dimethyltolylsilyl)oxymethyl]fluorine.

The silicon ether compounds of the formulae (I), (II), and (III) as defined above can be synthesized through processes as outlined below:

When A in said formulae (I), (II), or (III) is silicon atom, the silicon ether compounds can be obtained by directly reacting a diol compound corresponding to the formula (I), (II), or (III) with a trihydrocarbylsilylating agent. For instance, 9,9-bis[(trihydrocarbylsilyl)oxymethyl]fluorene compounds can be prepared by reacting a diol corresponding to the general formula (II), for example, 9,9-bis(hydroxymethyl)fluorene with a trihydrocarbylsilylating agent.

Among the diol compounds, those corresponding to the formula (I) are known in the art or can be synthesized through a method known in the art. For instance, preparation processes are described in Chinese Patent Nos. ZL89107675 and ZL91108297.2. Those diols corresponding to the formula (II) or (III) are also known in the art or can be synthesized through a method known in the art. For instance, 9,9-bis(hydroxymethyl)-fluorene can be prepared from fluorene according to a literature method (Acta Chemica Scandinava 1967, 21, 718). 2-Fluoro-9,9-bis(hydroxymethyl)-fluorene can be prepared from 2-fluorofluorene (see Chem. and Ind. 1961, 179) by the same method.

The trihydrocarbylsilylating agent can be selected from the group consisting of trihydrocarbylsilyl halides and hexahydrocarbyl disilazanes, such as trimethylsilyl chloride, ethyldimethylsilyl chloride, tert-butyldimethylsilyl chloride, n-butyldimethylsilyl chloride, dimethylphenylsilyl chloride, triethylsilyl chloride, benzyldimethylsilyl chloride, and hexamethyl disilazane.

In the case where a trihydrocarbylsilyl halide is used as the trihydrocarbylsilylating agent, the reaction is carried out in the presence of a base. The bases that can be employed in the reaction include inorganic bases and organic bases, for example, Na, K, NaOH, KOH, NaH, KH, $CaH_2$, $Na_2CO_3$, $K_2CO_3$, $NH_3$, $Et_3N$, $Me_3N$, $Bu_3N$, pyridine, 4-dimethylaminopyridine, imidazole, and mixture thereof. The organic bases, for example, $Et_3N$, 4-dimethylaminopyridine, imidazole, and mixture thereof are preferred.

In the case where a hexahydrocarbyl disilazane is used as the trihydrocarbylsilylating agent, the reaction can be carried out in the absence of base.

The reaction can be carried out at a temperature of from $-20°$ C. to $100°$ C., preferably from $-5°$ C. to room temperature.

The reaction can be carried out in the presence of a solvent, and the solvent used can be selected from the group consisting of halohydrocarbons, hydrocarbons, and ethers. Examples of the suitable solvent include, but are not limited to, dichloromethane, chloroform, benzene, toluene, n-hexane, cyclohexane, petroleum ether, diethyl ether, tetrahydrofuran, tert-butyl methyl ether, and the like. The preferred solvent is dichloromethane.

The preferred molar ratios of the raw materials are as follows:

(1) if a trihydrocarbylsilyl halide is used as the trihydrocarbylsilylating agent, then diol:trihydrocarbylsilyl halide:base=1:2 to 3:2 to 3;

(2) if a hexahydrocarbyl disilazane is used as the trihydrocarbylsilylating agent, then diol:hexahydrocarbyl disilazane=1:1 to 1.2.

In the case where A in said formulae of the silicon ester compounds is carbon atom, a diol compound corresponding to the general formula (I), (II), or (III) is mono-etherified by a haloalkane at first, and then reacts with a trihydrocarbylsilylating agent.

Specifically, the preparation comprises the steps of:

(a) Mono-Etherification of the Diol Compound:

For example, diol, 2,2-dihydrocarbyl-1,3-propandiol or 9,9-bis(hydroxymethyl)-fluorene, is mono-etherified with a haloalkane in the presence of a base, to form 2,2-dihydrocarbyl-3-hydrocarbyloxy-propanol or to form 9-hydrocarbyloxy-methyl-9-hydroxymethyl-fluorene.

The solvent used can be selected from the group consisting of tetrahydrofuran, dimethyl sulfoxide, diethyl ether, N,N-dimethylformamide; aliphatic hydrocarbons, such as, pentane, hexane, and heptane; and aromatic hydrocarbons, such as, benzene, and toluene.

The base used can be hydrides, hydroxides, or carbonates of alkali metal or alkali earth metal, such as, NaH, KH, $CaH_2$, NaOH, KOH, $Ca(OH)_2$, $Na_2(CO_3)$, $K_2(CO_3)$, and the like. Among these bases, NaH and NaOH are preferable. Furthermore, the base is preferably added gradually into the reaction mixture after the addition of the diol, haloalkane and solvent.

Molar ratio of the base to the diol is in a range of from 0.5:1 to 1.5:1, preferably from 0.8:1 to 1.2:1, and molar ratio of the haloalkane to the diol is in a range of from 1:1 to 10:1, preferably from 2.5:1 to 4:1. Reaction temperature can be in a range of from $-10°$ C. to $100°$ C., reaction pressure can be atmospheric pressure, and reaction time can varies from 1 to 48 hours.

(b) Silylation of the Monoether Compound:

The monoether compound, 2,2-dihydrocarbyl-3-hydrocarbyloxy-propanol or 9-hydrocarbyloxymethyl-9-hydroxymethyl-fluorene, obtained in the step (a) reacts with a trihydrocarbylsilylating agent at a temperature of from $-20°$ C. to $100°$ C., preferably from $-5°$ C. to room temperature, to form 2,2-dihydrocarbyl-1-hydrocarbyloxy-3-(trihydrocarbylsilyl)oxy-propane or 9-hydrocarbyloxymethyl-9-(trihydrocarbylsilyl)-oxymethyl-fluorene.

The solvent used can be selected from the group consisting of halohydrocarbons, hydrocarbons, and ethers. Examples of the suitable solvent include, but are not limited to, dichloromethane, chloroform, benzene, toluene, n-hexane, cyclohexane, petroleum ether, diethyl ether, tetrahydrofuran, tert-butyl methyl ether, and the like. The preferred solvent is dichloromethane.

The trihydrocarbylsilylating agent can be selected from the group consisting of trihydrocarbylsilyl halides and hexahydrocarbyl disilazanes, such as, trimethylsilyl chloride, ethyldimethylsilyl chloride, tert-butyldimethylsilyl chloride, n-butyldimethylsilyl chloride, dimethylphenylsilyl chloride, triethylsilyl chloride, benzyldimethylsilyl chloride, and hexamethyl disilazane, and the like.

In the case where a trihydrocarbylsilyl halide is used as the trihydrocarbylsilylating agent, the reaction is carried out in the presence of a base, and the raw materials are preferably charged at such amounts that molar ratio of monoether compound:trihydrocarbylsilyl halide:base is in the range of 1:1-1.2:1-1.2. The bases useful in the reaction include inorganic bases and organic bases, for example, Na, K, NaOH, KOH, NaH, KH, $CaH_2$, $Na_2CO_3$, $K_2CO_3$, $NH_3$, $Et_3N$, $Me_3N$, $Bu_3N$, pyridine, 4-dimethylaminopyridine, imidazole, and mixture thereof. Organic bases, for example, $Et_3N$, 4-dimethylaminopyridine, imidazole, and mixture thereof are preferable.

In the case where a hexahydrocarbyl disilazane is used as the trihydrocarbylsilylating agent, the reaction can be carried out in the absence of base, and the raw materials are preferably charged at such amounts that molar ratio of monoether compound:hexahydrocarbyl disilazane is in the range of 1:0.5-0.6.

The synthesis of the silicon ether compounds according to the present invention is described in details in Chinese Patent Application CN 02125224.6, the disclosure of which is incorporated herein by reference in its entirety.

The solid titanium-containing catalyst components, containing magnesium, titanium and halogen as essential components, of the catalysts according to the present invention comprise preferably a reaction product of a titanium compound, a magnesium compound and an internal electron donor compound. Examples of suitable solid titanium-containing catalyst components include various Ziegler-Natta type main catalyst components (or known as procatalysts) known in the art and conventionally used in homopolymerization or copolymerization of propylene. Such main catalyst components are described in, for example, CN85100997A, CN1258680A, CN1258683A, CN1258684A, CN1091748A, CN1330086A, CN1298887A, CN1298888A, and CN1436796A, the disclosures of which are incorporated herein by reference in their entirety.

The magnesium compounds useful in the present invention can be selected from the group consisting of magnesium dihalides, hydrates or alcohol addition compounds of magnesium dihalides, derivatives formed by replacing one halogen atom of a magnesium dihalide with hydrocarbyloxy group or halo-hydrocarbyloxy group, and mixtures thereof. The preferred are magnesium dihalides, for example, magnesium dichloride, magnesium dibromide, and magnesium diiodide.

The titanium compounds useful in the present invention include those represented by formula $Ti(OR)_{4-n}X_n$, in which R groups are independently $C_1$-$C_{20}$ hydrocarbyl, X is halogen, and n is from 1 to 4. Examples of the titanium compounds include, but are not limited to, titanium tetrachloride, titanium tetrabromide, titanium tetraiodide, tetrabutyl titanate, tetraethyl titanate, triethoxy titanium chloride, diethoxy titanium dichloride, ethoxy titanium trichloride, and any mixture thereof, with titanium tetrachloride being preferred.

The internal electron donor compounds useful in the present invention includes polycarboxylic acids, esters of mono-carboxylic acids and polycarboxylic acids, anhydrides, ketones, mono-ethers and poly-ethers, alcohols, amines, and the like, as well as derivatives thereof. Among these, esters of aliphatic dicarboxylic acids, esters of aromatic dicarboxylic acids, and diether compounds are preferred, and phthalates, malonates, succinates, glutarates, pivalates, carbonates are more preferred. Specific examples include diethyl phthalate, diisobutyl phthalate, di-n-butyl phthalate, diisooctyl phthalate, di-n-octyl phthalate, diethyl malonate, dibutyl malonate, diethyl 2,3-diisopropylsuccinate, diisobutyl 2,3-diisopropylsuccinate, di-n-butyl 2,3-diisopropylsuccinate, dimethyl 2,3-diisopropylsuccinate, diisobutyl 2,2-dimethylsuccinate, diisobutyl 2-ethyl-2-methylsuccinate, diethyl 2-ethyl-2-methylsuccinate, diethyl adipate, dibutyl adipate, diethyl sebate, dibutyl sebate, diethyl maleate, di-n-butyl maleate, diethyl naphthalene dicarboxylate, dibutyl naphthalene dicarboxylate, triethyl trimellitate, tributyl trimellitate, triethyl hemimellitate, tributyl hemimellitate, tetraethyl benzene-1,2,4,5-tetracarboxylate, tetrabutyl benzene-1,2,4,5-tetracarboxylate, and the like.

Another preferable class of internal electron donor compounds is esters of diols. Such compounds are disclosed in, for example, Chinese Patent Application No. CN1436766A and CN1436796A, the disclosures of which are incorporated herein by reference in their entirety.

According to a preferred embodiment of the invention, in the preparation of the solid titanium-containing catalyst components, the magnesium compound is preferably dissolved in a solvent system containing an organic epoxy compound and an organophosphorus compound.

The organic epoxy compound can be at least one selected from the group consisting of oxides of aliphatic olefin, diene or halogenated aliphatic olefin or diene; glycidyl ethers; and cyclic ethers, each having from 2 to 8 carbon atoms. Examples thereof include, but are not limited to, ethylene oxide, propylene oxide, butylene oxide, butadiene oxide, butadiene dioxide, epichlorohydrin, glycidyl methyl ether, diglycidyl ether, and tetrahydrofyran (THF).

The organophosphorus compound can be at least one selected from the group consisting of hydrocarbyl esters and halohydrocarbyl esters of ortho-phosphoric acid and phosphorous acid. Examples thereof include, but are not limited to, trimethyl phosphate, triethyl phosphate, tributyl phosphate, triphenyl phosphate, trimethyl phosphite, triethyl phosphite, tributyl phosphite, and triphenyl phosphite.

In one embodiment of the invention, the solid titanium-containing catalyst components according to the present invention can be prepared as follows.

Initially, the magnesium compound is dissolved in a solvent system consisting of the organic epoxy compound, the organophosphorus compound, and an inert diluent to form a homogeneous solution. Then the solution is mixed with the titanium compound, and solid precipitates in the presence of a precipitation aid. Next, the solid is treated with the internal electron donor compound so that the internal electron donor compound deposits on the solid. If necessary, the solid is further treated with titanium tetrahalide and an inert diluent.

The precipitation aid useful in the present invention can be one selected from the group consisting of organic acid anhydrides, organic acids, ethers, ketones, and mixture thereof. Examples thereof include, but are not limited to, acetic anhydride, phthalic anhydride, succinic anhydride, maleic anhydride, 1,2,4,5-benzene tetracarboxylic acid dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether and dipentyl ether.

Individual raw materials can be used in amounts of from 0.2 to 10 moles for the organic epoxy compound, from 0.1 to 3 moles for the organophosphorus compound, from 0.03 to 1.0 moles for the precipitation aid, from 0.5 to 150 moles for the titanium compound, and from 0.02 to 0.4 moles for the internal electron donor compound, based on per mole of the magnesium compound.

CN85100997, the disclosure of which is incorporated herein by reference in its entirety, describes in detail the preparation of the solid titanium-containing catalyst components according to the above embodiment of the present invention.

In another embodiment of the invention, the solid titanium-containing catalyst components can be prepared by reacting the titanium compound having the formula $Ti(OR)_{4-n}X_n$, as defined above, preferably $TiCl_4$, with an adduct of formula $MgCl_2 \cdot pROH$.

In the formula of $MgCl_2 \cdot pROH$, p is a value of from 0.1 to 6, preferably from 2 to 3.5, and R is hydrocarbyl having from 1 to 18 carbon atoms. The adduct can be advantageously formed into spheric shape according to the following process: the alcohol is mixed with magnesium dichloride in the presence of an inert hydrocarbon which is not miscible with the adduct, and the resultant emulsion is quenched quickly to solidify the adduct in the form of spheric particles. Such obtained adduct can directly react with the titanium compound, alternatively, before it reacts with the titanium compound, it can be subjected to a heat control dealcoholization at a temperature of from 80 to 130° C. to obtain an adduct, in which the p value is generally lower than 3, preferably in a range of from 0.1 to 2.7. The adduct (dealcoholized or as-such) can be suspended in cool $TiCl_4$ (typically at 0° C.), and reacted with the titanium compound by programmed heating the reaction mixture to a temperature of from 80 to 130° C. and holding at said temperature for 0.1 to 2 hours. The $TiCl_4$ treatment can be carried out for one or more times. During the $TiCl_4$ treatment, the internal electron donor compound can be added, and this treatment can also be repeated for one or more times.

CN1036011C and CN1330086A, the disclosures of which are incorporated herein by reference in their entirety, describe in detail the preparation of the solid titanium-containing catalyst components according to the above embodiment of the present invention.

The organo-aluminum component of the catalysts according to the invention can be a compound represented by formula $AlR_nX_{3-n}$, in which R is hydrogen, hydrocarbyl having 1 to 20 carbon atoms, X is halogen, and n is a value meeting the requirement of $1<n\leq3$. Examples of the organo-aluminum compound useful as the organo-aluminum component include, but are not limited to, triethyl aluminium, tripropyl aluminium, tri-n-butyl aluminium, triisobutyl aluminium, tri-n-hexyl aluminium, tri-n-octyl aluminium, triisooctyl aluminium, diethyl aluminium hydride, diisobutyl aluminium hydride, diethyl aluminium chloride, diisobutyl aluminium chloride, ethyl aluminium sesquichloride, ethyl aluminium dichloride, with triethyl aluminium and triisobutyl aluminium being preferred.

In the catalysts according to the invention, ratio of the individual components, (A), (B), and (C), is 1:5-1000:0-500, preferably 1:25-100:25-100, counted on the molar ratio of titanium:aluminum:silicon.

Another object of the invention is to provide use of the catalysts as described above in homopolymerization of an olefin having a formula of $CH_2=CHR$, in which R is hydrogen or $C_1$-$C_6$ alkyl or aryl, or in copolymerization of said olefin with an alpha olefin comonomer having from 2 to 20 carbon atoms.

Still another object of the invention is to provide a process for olefin polymerization, comprising contacting, under polymerization conditions, an olefin having a formula of $CH_2=CHR$, in which R is hydrogen or $C_1$-$C_6$ alkyl or aryl, and optional an alpha olefin comonomer having from 2 to 20 carbon atoms with the catalysts according to invention.

As used herein, the term "polymerization" includes homopolymerization and copolymerization.

More specifically, the invention is to provide a process for propylene polymerization, comprising contacting propylene and optional an alpha olefin comonomer having from 2 to 20 carbon atoms with the catalyst according to the invention under polymerization conditions.

The catalysts of the invention can be used in various known olefin polymerization processes, especially in propylene homopolymerization or copolyerization, including continuous polymerization and batch polymerization processes. For instance, the polymerization can be carried out in slurry phase with inert hydrocarbon solvents as diluent or in bulk with liquid monomers, such as propylene, as reaction media. Alternatively, the polymerization may be carried out in gas phase in one or more fluidized-bed or mechanically agitated bed reactors. A polymerization process comprising a combination of gas phase polymerization and liquid phase polymerization is also contemplated.

The polymerization reaction is generally carried out at a temperature of from 0 to 150° C., typically from 20 to 120° C., more typically from 40 to 100° C. When the polymerization is carried out in gas phase, operation pressure is usually in a range of from 0.5 to 10 MPa (absolute pressure, the same hereinafter), preferably from 1 to 5 MPa. The operation pressure in bulk polymerization is usually in a range of from 1 to 6 MPa, preferably from 1.5 to 4 MPa. Hydrogen or other compounds which act as chain-transfer agent can be used to control the molecular weight of polymers.

EMBODIMENTS OF THE INVENTION

The following examples further describe the invention, but do not make limitation to the invention in any way.

Testing Methods:
1. Isotacticity of polymer: measured by heptane extraction method (heptane boiling extraction for 6 hours) carried out according to the following procedure: 2 g of dried polymer sample is extracted with boiling heptane in an extractor for 6 hours, then the residual substance is dried to constant weight, and ratio of the weight of the residual polymer (g) to 2 is taken as isotacticity.
2. Melt index of polymer: measured according to ASTM D1238-99.

PREPARATION EXAMPLES

Some intermediates used in the Preparation Examples were prepared as follows.

Preparation of
9-methoxymethyl-9-hydroxymethyl-fluorene

Under nitrogen atmosphere and water-free conditions, to a reactor were added in succession 80 ml of THF, 22.6 g of 9,9-bis(hydroxymethyl)fluorene and 57 g of methyl iodide. After the reaction mixture was admixed homogeneously by stirring, 4.6 g of 52% NaH in mineral oil was added batch-wise over 2 hours at room temperature. Upon completing the addition, the reaction mixture was stirred for further 2 hours. The unreacted methyl iodide was recovered by distillation. The remainder was diluted with 100 ml of water, and extracted twice using 100 ml of diethyl ether for each time. The combined diethyl ether extract was dried over anhydrous sodium sulfate. After drying, the ether solution was evaporated to dryness to give 22.8 g of crude. The crude was purified through column chromatography to give 14.9 g of 9-methoxymethyl-9-hydroxymethyl-fluorene (yield 62%).

$^1$H-NMR ($CDCl_3$/TMS δ ppm): 1.70 (s, 1H, OH), 3.40 (s, 3H, $OCH_3$), 3.71 (s, 2H, —$CH_2O$—), 3.96 (s, 2H, —$CH_2O$—), 7.31 (t, 2H, 2ArH), 7.41 (t, 2H, 2ArH), 7.65 (d, 2H, 2ArH), 7.75 (d, 2H, 2ArH).

Preparation of
9-ethoxymethyl-9-hydroxymethyl-fluorene

The target product as white crystal was prepared from 9,9-bis(hydroxymethyl)fluorene and ethyl iodide through the same procedure as described above. Yield: 51%.

¹H-NMR (CDCl₃/TMS δ ppm): 1.28(t, 3H, CH₃), 2.74(t, 1H, OH), 3.54(q, 2H, OCH₂), 3.76(s, 2H, CH₂O), 3.98(d, 2H, CH₂O), 7.33(t, 2H, 2ArH), 7.42(t, 2H, 2ArH), 7.67(d, 2H, 2ArH), 7.77(d, 2H, ArH)

Preparation of 2,2-dimethyl-3-methoxypropanol 2,2-Dimethyl-3-methoxypropanol was prepared from 2,2-dimethyl-1,3-propandiol and methyl iodide through the same procedure as described above.
¹H-NMR(CDCl₃/TMS) δ (ppm): 0.91(s, 6 H, 2CH₃), 2.77 (t, 1H, OH), 3.25(s, 2H, —CH₂O—), 3.34(s, 3 H, OCH₃), 3.44(d, 2H, —CH₂O—).

Preparation of 2,2-dibenzyl-3-methoxy-1-propanol 2,2-Dibenzyl-3-methoxypropanol was prepared from 2,2-dibenzyl-1,3-propandiol and methyl iodide through the same procedure as described above.
¹H-NMR(CDCl₃/TMS) δ (ppm): 2.34(t, 1H, OH), 2.75(s, 4H, CH₂Ph), 3.13(s, 2H, CH₂O), 3.33(s, 3H, OCH₃), 3.44(d, 2H, CH₂O), 7.20(m, 6H, 6ArH), 7.28(m, 4H, 4ArH)

Preparation of 2,2-diisobutyl-3-methoxy-1-propanol 2,2-Diisobutyl-3-methoxypropanol was prepared from 2,2-diisobutyl-1,3-propandiol and methyl iodide through the same procedure as described above.
¹H-NMR(CDCl₃/TMS) δ (ppm): 0.92(t, 12H, 4CH₃), 1.26(d, 4H, 2CH₂), 1.69(m, 2H, 2CH), 2.84(t, 1H, OH), 3.31(2s, 5H, CH₃O, CH₂O), 3.52(d, 2H, CH₂O)

Preparation of 2,2-di-n-butyl-3-methoxy-1-propanol 2,2-Di-n-butyl-3-methoxy-propanol was prepared from 2,2-di-n-butyl-1,3-propandiol and methyl iodide through the same procedure as described above.
¹H-NMR(CDCl₃/TMS) δ (ppm): 0.90(t, 6H, 2CH₃), 1.20 (t, 4H, 2CH₂), 1.26(m, 8H, 4CH₂), 2.75(t, 1H, OH), 3.29(s, 2H, CH₂O), 3.32(s, 3H, OCH₃), 3.48(d, 2H, CH₂O)

Preparation of 2,2-di-n-propyl-3-methoxy-1-propanol 2,2-Di-n-propyl-3-methoxypropanol was prepared from 2,2-di-n-propyl-1,3-propandiol and methyl iodide through the same procedure as described above.
¹H-NMR(CDCl₃/TMS) δ (ppm): 0.89(t, 6H, 2CH₃), 1.24 (m, 8H, 4CH₂), 2.70(s, 1H, OH), 3.28(s, 2H, CH₂O), 3.32(s, 3H, OCH₃), 3.48(s, 2H, CH₂O)

PREPARATION EXAMPLE 1

Preparation of 9-methoxymethyl-9-(trimethylsilyl)oxymethyl-fluorene 1 g of 9-methoxymethyl-9-hydroxymethyl-fluorene was dissolved in 20 ml of dichloromethane. The solution was cooled in ice-water bath to below 5° C., and 0.7 ml of triethyl amine was added thereto. After stirring for 5 minutes, 0.6 ml of trimethylsilyl chloride was added drop-wise, and the mixture was stirred for further 2 hours, followed by stirring at room temperature for 1 hour. The reaction mixture was washed with water, and the organic layer separated was dried over anhydrous sodium sulfate. After filtration, the filtrate was evaporated to give 1.41 g of concentrate (yield 86%). MS(EI) m/e: 312(M⁺).

¹H-NMR (CDCl₃/TMS) δ (ppm): 0.15 (s, 9H, 3CH₃), 3.42 (s, 3H, —OCH₃), 3.74 (s, 2H, —CH₂O—), 3.82 (s, 2H, —CH₂O—), 7.36 (t, 2H, ArH), 7.44 (t, 2H, ArH), 7.70 (d, 2H, ArH), 7.80 (d, 2H, ArH).

PREPARATION EXAMPLE 2

Preparation of 9-methoxymethyl-9-(ethyldimethylsilyl)oxymethyl-fluorene

According to the procedure as described in Preparation Example 1, 9-methoxymethyl-9-(ethyldimethylsilyl)oxymethyl-fluorene was prepared from intermediate 9-methoxymethyl-9-(hydroxymethyl)-fluorene and reagent ethyldimethylsilyl chloride.
¹H-NMR (CDCl₃/TMS) δ (ppm): 0.04(s, 6H, 2CH₃), 0.61(q, 2H, CH₂), 0.93(t, 3H, CH₃), 3.33(s, 3H, OCH₃), 3.66(s, 2H, —CH₂O—), 3.75(s, 2H, —CH₂O—), 7.25(t, 2H, 2ArH), 7.33(t, 2H, 2ArH), 7.65(d, 2H, 2ArH), 7.74(d, 2H, 2ArH)

PREPARATION EXAMPLE 3

Preparation of 9-methoxymethyl-9-(n-butyldimethylsilyl)oxymethyl-fluorene

According to the procedure as described in Preparation Example 1, 9-methoxymethyl-9-(n-butyldimethylsilyl)oxymethyl-fluorene was prepared from intermediate 9-methoxymethyl-9-(hydroxymethyl)-fluorene and reagent n-butyldimethylsilyl chloride.
¹H-NMR (CDCl₃/TMS) δ (ppm): 0.04(s, 6H, 2CH₃), 0.57(t, 2H, CH₂), 0.88(t, 3H, CH₃), 1.31(m, 4H, 2CH₂), 3.34(s, 3H, OCH₃), 3.67(s, 2H, CH₂), 3.75(s, 2H, CH₂O), 7.26(t, 2H, 2ArH), 7.38(t, 2H, 2ArH), 7.64(d, 2H, 2ArH), 7.74(d, 2H, 2ArH)

PREPARATION EXAMPLE 4

Preparation of 9-methoxymethyl-9-(dimethylphenylsilyl)oxymethyl-fluorene

According to the procedure as described in Preparation Example 1, 9-methoxymethyl-9-(dimethylphenylsilyl)oxymethyl-fluorene was prepared from intermediate 9-methoxymethyl-9-(hydroxymethyl)-fluorene and reagent dimethylphenylsilyl chloride.
¹H-NMR (CDCl₃/TMS) δ (ppm): 0.32(s, 6H, 2CH₃), 3.31(s, 3H, OCH₃), 3.68(s, 2H, —CH₂O—), 3.81(s, 2H, —CH₂O), 7.25(t, 2H, 2ArH), 7.35(m, 5H, 5ArH), 7.52(t, 2H, 2ArH), 7.61(d, 2H, 2ArH), 7.71(d, 2H, 2ArH)

PREPARATION EXAMPLE 5

Preparation of 9-methoxymethyl-9-(triethylsilyl)oxymethyl-fluorene

According to the procedure as described in Preparation Example 1, 9-methoxymethyl-9-(triethylsilyl)oxymethyl-fluorene was prepared from intermediate 9-methoxymethyl-9-(hydroxymethyl)-fluorene and reagent triethylsilyl chloride.
¹H-NMR (CDCl₃/TMS) δ (ppm): 0.62(q, 6H, 3CH₂), 0.95(t, 9H, 3CH₃), 3.36(s, 3H, OCH₃), 3.70(s, 2H, —CH₂O—), 3.79(s, 2H, —CH₂O—), 7.29(t, 2H, 2ArH), 7.40(t, 2H, 2ArH), 7.68(d, 2H, 2ArH), 7.77(d, 2H, 2ArH)

PREPARATION EXAMPLE 6

Preparation of 9-methoxymethyl-9-(benzyldimethyl-silyl)oxymethyl-fluorene

According to the procedure as described in Preparation Example 1, 9-methoxymethyl-9-(benzyldimethylsilyl) oxymethyl-fluorene was prepared from intermediate 9-methoxymethyl-9-(hydroxymethyl)-fluorene and reagent benzyldimethylsilyl chloride.

$^1$H-NMR (CDCl$_3$/TMS) δ (ppm): 0.03(s, 6H, 2CH$_3$), 2.17(s, 2H, CH$_2$), 3.33(s, 3H, OCH$_3$), 3.62(s, 2H, CH$_2$O), 3.76(s, 2H, CH$_2$O), 7.04(d, 2H, 2ArH), 7.08(t, 2H, 2ArH), 7.20(t, 1H, ArH), 7.24(t, 2H, 2ArH), 7.37(t, 2H, 2ArH), 7.54(d, 2H, 2ArH), 7.73(d, 2H, 2ArH)

PREPARATION EXAMPLE 7

Preparation of 9-(ethoxymethyl)-9-[(trimethylsilyl) oxymethyl]-fluorene

According to the procedure as described in Preparation Example 1, 9-(ethoxymethyl)-9-[(trimethylsilyl)oxymethyl]-fluorene was prepared from intermediate 9-ethoxymethyl-9-(hydroxymethyl)-fluorene and reagent trimethylsilyl chloride.

$^1$H-NMR (CDCl$_3$/TMS) δ (ppm): 0.07(s, 9H, 3CH$_3$), 1.21(t, 3H, CH$_3$), 3.47(q, 2H, CH$_2$O), 3.64(s, 2H, CH$_2$O), 3.76(s, 2H, CH$_2$O), 7.26(t, 2H, 2ArH), 7.37(t, 2H, 2ArH), 7.64(d, 2H, 2ArH), 7.73(d, 2H, 2ArH)

PREPARATION EXAMPLE 8

Preparation of 9-(methoxymethyl)-9-[(tert-butyldimethylsilyl)oxymethyl]-fluorene 1 g of 9-methoxymethyl-9-hydroxymethyl-fluorene (4.16 mmol) was dissolved in 10 ml of N,N-dimethyl formamide, and 0.14 g (2.08 mmol) of imidazole was added thereto. The solution was cooled in ice-water bath to below 5° C., and 0.87 ml of triethyl amine (6.24 mmol) was added thereto. After stirring for 5 minutes, 0.88 g of tert-butyldimethylsilyl chloride (5.82 mmol) in 10 ml of N,N-dimethyl formamide was added drop-wise to the reaction mixture, and the mixture was stirred for further 2 hours, followed by stirring at room temperature for 1 hour. The reaction mixture was diluted with 10 ml of water, and extracted using 30 ml of dichloromethane. The organic phase was wished twice with 20 ml of water, dried over anhydrous sodium sulfate. After filtration, the filtrate was evaporated to give 1.28 g of 9-methoxymethyl-9-[(tert-butyldimethylsilyl )oxymethyl]-fluorene crude product as pale yellow liquid. The crude product was purified by column chromatography using petroleum ether as eluent, to give colorless pure compound.

$^1$H-NMR (CDCl$_3$/TMS) δ (ppm): 0.03(s, 6H, 2CH$_3$), 0.95(s, 9H, 3CH$_3$), 3.36(s, 3H, OCH$_3$), 3.68(s, 2H, —CH$_2$O—), 3.78(s, 2H, —CH$_2$O—), 7.30(t, 2H, 2ArH), 7.39(t, 2H, 2ArH), 7.67(d, 2H, 2ArH), 7.76(d, 2H, 2ArH)

PREPARATION EXAMPLE 9

Preparation of 9,9-bis[(trimethylsilyl)oxymethyl]-fluorene 1 g of 9,9-bis(hydroxymethyl)-fluorene was admixed with 20 ml of dichloromethane. The mixture was cooled in ice-water bath, and 1.9 ml of triethyl amine was added thereto. Then 1.4 ml of trimethylsilyl chloride was added drop-wise, and the mixture was stirred in ice-water bath for further 2 hours. The reaction mixture was washed with water, and the organic layer separated was dried over anhydrous sodium sulfate. After filtration, the filtrate was evaporated to give 1.41 g of concentrate (yield 88%). The crude product was purified by column chromatography using petroleum ether as eluent, to give colorless pure compound. MS (El) m/e: 370(M$^+$).

$^1$H-NMR (CDCl$_3$/TMS) δ (ppm): 0.08 (s, 18H, 6CH$_3$), 3.77 (s, 4H, 2—CH$_2$O—), 7.26 (t, 2H, ArH), 7.38 (t, 2H, ArH), 7.62 (d, 2H, ArH), 7.72 (d, 2H, ArH).

PREPARATION EXAMPLE 10

Preparation of 9,9-bis[(ethyldimethylsilyl)oxymethyl]-fluorene

According to the procedure as described in Preparation Example 9, 9,9-bis[(ethyldimethylsilyl)oxymethyl]-fluorene was prepared from intermediate 9,9-bis(hydroxymethyl)-fluorene and reagent ethyldimethylsilyl chloride.

$^1$H-NMR (CDCl$_3$/TMS) δ (ppm): 0.008(s, 12H, 4CH$_3$), 0.52(q, 4H, 2CH$_2$), 0.88(t, 6H, 2CH$_3$), 3.74(s, 4H, 2CH$_2$O), 7.21(t, 2H, 2ArH), 7.32(t, 2H, 2ArH), 7.59(d, 2H, 2ArH), 7.67(d, 2H, 2ArH)

PREPARATION EXAMPLE 11

Preparation of 9,9-bis[(n-butyldimethylsilyl)oxymethyl]-fluorene

According to the procedure as described in Preparation Example 9, 9,9-bis[(n-butyldimethylsilyl)oxymethyl]-fluorene was prepared from intermediate 9,9-bis(hydroxymethyl)-fluorene and reagent n-butyldimethylsilyl chloride.

$^1$H-NMR (CDCl$_3$/TMS) δ (ppm): 0.04(s, 12H, 4CH$_3$), 0.57(t, 4H, 2CH$_2$), 0.87(t, 6H, 2CH$_3$), 1.29(m, 8H, 4CH$_2$), 3.77(s, 4H, 2CH$_2$O), 7.25(t, 2H, 2ArH), 7.37(t, 2H, 2ArH), 7.62(d, 2H, 2ArH), 7.73(d, 2H, 2ArH)

PREPARATION EXAMPLE 12

Preparation of 9,9-bis[(dimethylphenylsilyl)oxymethyl]-fluorene

According to the procedure as described in Preparation Example 9, 9,9-bis[(dimethylphenylsilyl)oxymethyl]-fluorene was prepared from intermediate 9,9-bis(hydroxymethyl)-fluorene and reagent dimethylphenylsilyl chloride.

$^1$H-NMR (CDCl$_3$/TMS) δ (ppm): 0.33(s, 12H, 4CH$_3$), 3.88(s, 4H, 2—CH$_2$O—), 7.25(t, 2H, 2ArH), 7.35(m, 8H, 8ArH), 7.51(d, 4H, 4ArH), 7.61(d, 2H, 2ArH), 7.71(d, 2H, 2ArH)

PREPARATION EXAMPLE 13

Preparation of 9,9-bis[(triethylsilyl)oxymethyl]-fluorene

According to the procedure as described in Preparation Example 9, 9,9-bis[(triethylsilyl)oxymethyl]-fluorene was prepared from intermediate 9,9-bis(hydroxymethyl)-fluorene and reagent triethylsilyl chloride.

$^1$H-NMR (CDCl$_3$/TMS) δ (ppm): 0.56(q, 12H, 6CH$_2$), 0.92(t, 18H, 6CH$_3$), 3.83(s, 4H, 2—CH$_2$O—), 7.24(t, 2H, 2ArH), 7.36(t, 2H, 2ArH), 7.63(d, 2H, 2ArH), 7.71(d, 2H, 2ArH)

PREPARATION EXAMPLE 14

Preparation of 9,9-bis[(benzyldimethylsilyl)oxymethyl]-fluorene

According to the procedure as described in Preparation Example 9, 9,9-bis[(benzyldimethylsilyl)oxymethyl]-fluorene was prepared from intermediate 9,9-bis(hydroxymethyl)-fluorene and reagent benzyldimethylsilyl chloride.

$^1$H-NMR (CDCl$_3$/TMS) δ (ppm): 0.04(s, 12H, 4CH$_3$), 2.16(s, 4H, 2CH$_2$), 3.77(s, 4H, 2CH$_2$O), 7.02(d, 4H, 4ArH), 7.08(t, 2H, 2ArH), 7.21 (m, 6H, 6ArH), 7.37(t, 2H, 2ArH), 7.42(d, 2H, 2ArH), 7.72(d, 2H, 2ArH)

PREPARATION EXAMPLE 15

Preparation 9,9-bis[(tert-butyldimethylsilyl)oxymethyl]-fluorene 1 g of 9,9-bis(hydroxymethyl)-fluorene was admixed with 10 ml of N,N-dimethyl formamide, and 0.31 g of imidazole was added thereto. The mixture was cooled in ice-water bath, and 2.1 ml of triethyl amine was added thereto. After stirring for 5 minutes, 1.86 g of tert-butyldimethylsilyl chloride in 10 ml of N,N-dimethyl formamide was added drop-wise to the reaction mixture, and the mixture was stirred in ice-water bath for further 4 hours. The reaction mixture was diluted with 10 ml of water, and extracted twice using 20 ml of dichloromethane for each time. The combined dichloromethane extract was dried over anhydrous sodium sulfate. After filtration, the filtrate was evaporated to dryness to give 1.73 g of concentrate. White crystal was obtained by recrystallization from n-hexane. m.p. 84° C.

$^1$H-NMR(CDCl$_3$/TMS) δ (ppm): 0.00(s, 12H, 4CH$_3$), 0.92(s, 18H, 6CH$_3$), 3.82(s, 4H, 2—CH$_2$O—), 7.26(t, 2H, 2ArH), 7.36(t, 2H, 2ArH), 7.65(d, 2H, 2ArH), 7.71(d, 2H, 2ArH).

PREPARATION EXAMPLE 16

Preparation of 2,2-dimethyl-1-methoxy-3-[(trimethylsilyl)oxy]propane 1 g of 2,2-dimethyl-3-methoxy-1-propanol was dissolved in 20 ml of dichloromethane. The resultant solution was cooled in ice-water bath to below 5° C., and 1.65 ml of triethyl amine was added thereto. After stirring the mixture 5 minutes, 1.29 ml of trimethylsilyl chloride was added drop-wise to the reaction mixture, and the mixture was stirred in ice-water bath for further 2 hours, and at room temperature for further 1 hour. The reaction mixture was washed with water, and the organic layer separated was dried over anhydrous sodium sulfate. After filtration, the filtrate was evaporated to give 1.33 g of concentrate. The crude product was purified by column chromatography using petroleum ether as eluent, to give colorless pure compound.

$^1$H-NMR(CDCl$_3$/TMS) δ (ppm): 0.09(s, 9 H, 3CH$_3$), 0.85(s, 6 H, 2CH$_3$), 3.11(s, 2H, —CH$_2$O—), 3.30(s, 2H, —CH$_2$O—), 3.32(s, 3H, CH$_3$O—).

PREPARATION EXAMPLE 17

Preparation of 2,2-dimethyl-1-methoxy-3-[(ethyldimethylsilyl)oxy]propane

According to the procedure as described in Preparation Example 16, 2,2-dimethyl-1-methoxy-3-[(ethyldimethylsilyl)oxy]propane was prepared from intermediate 2,2-dimethyl-3-methoxy-1-propanol and reagent ethyldimethylsilyl chloride.

$^1$H-NMR(CDCl$_3$/TMS) δ (ppm): 0.06(s, 6H, 2CH$_3$), 0.54 (q, 2H, CH$_2$), 0.85(s, 6H, 2CH$_3$), 0.95(t, 3H, CH$_3$), 3.11(s, 2H, CH$_2$O), 3.31(2s, 5H, CH$_3$O, CH$_2$O)

PREPARATION EXAMPLE 18

Preparation of 2,2-dimethyl-1-methoxy-3-[(tert-butyldimethylsilyl)oxy]propane

According to the procedure as described Preparation Example 8, 2,2-dimethyl-1-methoxy-3-[(tert-butyldimethylsilyl)oxy]propane was prepared from intermediate 2,2-dimethyl-3-methoxy-1-propanol and reagent tert-butyldimethylsilyl chloride.

$^1$H-NMR(CDCl$_3$/TMS) δ (ppm): 0.01(s, 6H, 2CH$_3$), 0.85 (s, 6H, 2CH$_3$), 0.88(s, 9H, 3CH$_3$), 3.10(s, 2H, CH$_2$O), 3.30 (s, 5H, CH$_2$O, OCH$_3$)

PREPARATION EXAMPLE 19

Preparation of 2,2-dimethyl-1-methoxy-3-[(dimethylphenylsilyl)oxy]propane

According to the procedure as described Preparation Example 16, 2,2-dimethyl-1-methoxy-3-[(dimethylphenylsilyl)oxy]propane was prepared from intermediate 2,2-dimethyl-3-methoxy-1-propanol and reagent dimethylphenylsilyl chloride.

$^1$H-NMR(CDCl$_3$/TMS) δ (ppm): 0.35(s, 6H, 2CH$_3$), 0.87 (s, 6H, 2CH$_3$), 3.13(s, 2H, CH$_2$O), 3.30(s, 3H, OCH$_3$), 3.37 (s, 2H, CH$_2$O), 7.38(m, 3H, 3ArH), 7.58(m, 2H, 2ArH)

PREPARATION EXAMPLE 20

Preparation of 2,2-dimethyl-1-methoxy-3-[(triethylsilyl)oxy]propane

According to the procedure as described Preparation Example 16, 2,2-dimethyl-1-methoxy-3-[(triethylsilyl)oxy]propane was prepared from intermediate 2,2-dimethyl-3-methoxy-1-propanol and reagent triethylsilyl chloride.

$^1$H-NMR(CDCl$_3$/TMS) δ (ppm): 0.56(q, 6H, 3CH$_2$), 0.86 (s, 6H, 2CH$_3$), 0.96(t, 9H, 3CH$_3$), 3.12(s, 2H, CH$_2$O), 3.31(s, 3H, OCH$_3$), 3.33(s, 2H, CH$_2$O)

PREPARATION EXAMPLE 21

2,2-dibenzyl-1-methoxy-3-[(trimethylsilyl)oxy]propane

According to the procedure as described Preparation Example 16, 2,2-dibenzyl-1-methoxy-3-[(trimethylsilyl)oxy]propane was prepared from intermediate 2,2-dibenzyl-3-methoxy-1-propanol and reagent trimethylsilyl chloride.

$^1$H-NMR(CDCl$_3$/TMS) δ (ppm): 0.17(s, 9H, 3CH$_3$), 2.72-2.82(dd, 4H, 2CH$_2$), 2.81(s, 2H, CH$_2$O), 3.10(s, 2H, CH$_2$O), 3.46(s, 3H, OCH$_3$), 3H, OCH$_3$), 7.22(m, 6H, 6ArH), 7.29(q, 4H, 4ArH)

PREPARATION EXAMPLE 22

Preparation of 2,2-dibenzyl-1-methoxy-3-[(tert-butyldimethylsilyl)oxy]propane

According to the procedure as described Preparation Example 8, 2,2-dibenzyl-1-methoxy-3-[(tert-butyldimethylsilyl)oxy]propane was prepared from intermediate 2,2-dibenzyl-3-methoxy-1-propanol and reagent tert-butyldimethylsilyl chloride.

$^1$H-NMR(CDCl$_3$/TMS) δ (ppm): 0.07(s, 6H, 2CH$_3$), 1.01 (s, 9H, 3CH$_3$), 2.68-2.79(dd, 4H, 2CH$_2$), 2.83(s, 2H, CH$_2$O), 3.18(s, 2H, CH$_2$O), 3.31(s, 3H, OCH$_3$), 7.25(m, 10H, 10ArH)

PREPARATION EXAMPLE 23

Preparation of 2,2-diisobutyl-1-methoxy-3-[(trimethylsilyl)oxy]propane

According to the procedure as described Preparation Example 16, 2,2-diisobutyl-1-methoxy-3-[(trimethylsilyl)oxy]propane was prepared from intermediate 2,2-diisobutyl-3-methoxy-1-propanol and reagent trimethylsilyl chloride.

$^1$H-NMR(CDCl3/TMS) δ (ppm): 0.06(s, 9H, 3CH$_3$), 0.89 (d, 6H, 2CH$_3$), 0.90(d, 6H, 2CH$_3$), 1.16(d, 2H, CH$_2$), 1.18(d, 2H, CH$_2$), 1.68(m, 2H, 2CH), 3.12(s, 2H, CH$_2$O), 3.26(s, 3H, OCH$_3$), 3.47(s, 2H, CH$_2$O)

PREPARATION EXAMPLE 24

Preparation of 2,2-di-n-butyl-1-methoxy-3-[(trimethylsilyl)oxy]propane

According to the procedure as described Preparation Example 16, 2,2-di-n-butyl-1-methoxy-3-[(trimethylsilyl)oxy]propane was prepared from intermediate 2,2-di-n-butyl-3-methoxy-1-propanol and reagent trimethylsilyl chloride.

$^1$H-NMR(CDCl/TMS) δ (ppm): 0.07(s, 9H, 3CH$_3$), 0.89 (t, 6H, 2CH$_3$), 1.17(m, 8H, 4CH$_2$), 1.26(m, 4H, 2CH$_2$), 3.11(s, 2H, CH$_2$O), 3.28(s, 3H, OCH$_3$), 3.31(s, 2H, CH$_2$O)

PREPARATION EXAMPLE 25

Preparation of 2,2-di-n-butyl-1-methoxy-3-[(tert-butyldimethylsilyl)oxy]propane

According to the procedure as described Preparation Example 8, 2,2-di-n-butyl-1-methoxy-3-[(tert-butyldimethylsilyl)oxy]propane was prepared from intermediate 2,2-di-n-butyl-3-methoxy-1-propanol and reagent tert-butyldimethylsilyl chloride.

$^1$H-NMR(CDCl$_3$/TMS) δ (ppm): 0.02(s, 6H, 2CH$_3$), 0.88 (s, 9H, 3CH$_3$), 0.91(t, 6H, 2CH$_3$), 1.17(m, 8H, 4CH$_3$), 1.27(m, 4H, 2CH$_2$), 3.12(s, 2H, CH$_2$O), 3.30(s, 3H, OCH$_3$), 3.34(s, 2H, CH$_2$O)

PREPARATION EXAMPLE 26

Preparation of 2,2-di-n-butyl-1-methoxy-3-[(triethylsilyl)oxy]propane

According to the procedure as described Preparation Example 16, 2,2-di-n-butyl-1-methoxy-3-[(triethylsilyl)oxy]propane was prepared from intermediate 2,2-di-n-butyl-3-methoxy-1-propanol and reagent triethylsilyl chloride.

$^1$H-NMR(CDCl$_3$/TMS) δ (ppm): 0.57(q, 6H, 3CH$_2$), 0.91 (t, 6H, 2CH$_3$), 0.96(t, 9H, 3CH$_3$), 1.20(m, 8H, 4CH$_2$), 1.27(m, 4H, 2CH$_2$), 3.14(s, 2H, CH$_2$O), 3.30(s, 3H, OCH$_3$), 3.36(s, 2H, CH$_2$O)

PREPARATION EXAMPLE 27

Preparation of 2,2-di-n-propyl-1-methoxy-3-[(trimethylsilyl)oxy]propane

According to the procedure as described Preparation Example 16, 2,2-di-n-propyl-1-methoxy-3-[(trimethylsilyl)oxy]propane was prepared from intermediate 2,2-di-n-propyl-3-methoxy-1-propanol and reagent trimethylsilyl chloride.

$^1$H-NMR(CDCl$_3$/TMS) δ (ppm): 0.07(s, 9H, 3CH$_3$), 0.88 (t, 6H, 2CH$_3$), 1.17(m, 8H, 4CH$_2$), 3.11(s, 2H, CH$_2$O), 3.28(s, 3H, OCH$_3$), 3.32(s, 2H, CH$_2$O)

PREPARATION EXAMPLE 28

Preparation of 2,2-dimethyl-1,3-bis[(trimethylsilyl)oxy]propane 0.6 g of 2,2-dimethyl-1,3-propandiol was admixed with 20 ml of dichloromethane. The mixture was cooled in ice-water bath, thereto was added 2.09 ml of triethyl amine, followed by the addition of 1.76 ml of trimethylsilyl chloride. The mixture was stirred in ice-water bath for further 2 hours. The reaction mixture was washed with water, and the organic layer separated was dried over anhydrous sodium sulfate. After filtration, the filtrate was evaporated to give 1.23 g of concentrate. The crude product was purified by column chromatography using petroleum ether as eluent, to give colorless pure compound.

$^1$H-NMR(CDCl$_3$/TMS) δ (ppm): 0.16(s, 18 H, 6CH$_3$), 0.86(s, 6H, 2CH$_3$), 3.35(s, 4H, 2—CH$_2$O—).

PREPARATION EXAMPLE 29

Preparation of 2,2-dimethyl-1,3-bis[(ethyldimethylsilyl)oxy]-propane

According to the procedure as described Preparation Example 28, 2,2-dimethyl-1,3-bis[(ethyldimethylsilyl)oxy]propane was prepared from intermediate 2,2-dimethyl-1,3-propandiol and reagent ethyldimethylsilyl chloride.

$^1$H-NMR (CDCl3/TMS) δ (ppm): 0.06(s, 12H, 4CH$_3$), 0.56(q, 4H, 2CH$_2$), 0.81(s, 6H, 2CH$_3$), 0.97(t, 6H, 2CH$_3$), 3.33(s, 4H, 2CH$_2$O)

PREPARATION EXAMPLE 30

Preparation of 2,2-dimethyl-1,3-bis[(tert-butyldimethylsilyl)oxy]-propane

According to the procedure as described Preparation Example 15, 2,2-dimethyl-1,3-bis[(tert-butyldimethylsilyl)oxy]propane was prepared from intermediate 2,2-dimethyl-1,3-propandiol and reagent tert-butyldimethylsilyl chloride.

$^1$H-NMR (CDCl$_3$/TMS) δ (ppm): 0.02(s, 12H, 4CH$_3$), 0.79(s, 6H, 2CH$_3$), 0.88(s, 18H, 6CH$_3$), 3.30(s, 4H, 2CH$_2$O)

PREPARATION EXAMPLE 31

Preparation of 2,2-dimethyl-1,3-bis[(dimethylphenylsilyl)oxy]-propane

According to the procedure as described Preparation Example 28, 2,2-dimethyl-1,3-bis[(dimethylphenylsilyl)oxy]propane was prepared from intermediate 2,2-dimethyl-1,3-propandiol and reagent dimethylphenylsilyl chloride.

$^1$H-NMR (CDCl$_3$/TMS) δ (ppm): 0.33(s, 12H, 4CH$_3$), 0.81(s, 6H, 2CH$_3$), 3.35(s, 4H, 2CH$_2$O), 7.35(m, 6H, 6ArH), 7.55(m, 4H, 4ArH)

PREPARATION EXAMPLE 32

Preparation of 2,2-dimethyl-1,3-bis[(triethylsilyl)oxy]propane

According to the procedure as described Preparation Example 28, 2,2-dimethyl-1,3-bis[(triethylsilyl)oxy]propane was prepared from intermediate 2,2-dimethyl-1,3-propandiol and reagent triethylsilyl chloride.

$^1$H-NMR (CDCl$_3$/TMS) δ (ppm): 0.57(q, 12H, 6CH$_2$), 0.80(s, 6H, 2CH$_3$), 0.94(t, 18H, 6CH$_3$), 3.32(s, 4H, 2CH$_2$O)

PREPARATION EXAMPLE 33

Preparation of 2,2-dibenzyl-1,3-bis[(trimethylsilyl)oxy]propane

According to the procedure as described Preparation Example 28, 2,2-dibenzyl-1,3-bis[(trimethylsilyl)oxy]propane was prepared from intermediate 2,2-dibenzyl-1,3-propandiol and reagent trimethylsilyl chloride.

$^1$H-NMR (CDCl$_3$/TMS) δ (ppm): 0.13(s, 18H, 6CH$_3$), 2.71(s, 4H, 2CH$_2$Ph), 3.02(s, 4H, 2CH$_2$O), 7.19(m, 2H, 2ArH), 7.24(m, 8H, 8ArH)

PREPARATION EXAMPLE 34

Preparation of 2,2-diisobutyl-1,3-bis[(trimethylsilyl)oxy]propane 0.9 g of 2,2-diisobutyl-1,3-propandiol was admixed with 20 ml of dichloromethane. The mixture was cooled in ice-water bath, thereto was added 2.0 ml of triethyl amine, followed by the addition of 1.58 ml of trimethylsilyl chloride. The mixture was stirred in ice-water bath for further 2 hours. The reaction mixture was washed with water, and the organic layer separated was dried over anhydrous sodium sulfate. After filtration, the filtrate was evaporated to give 1.45 g of concentrate. The crude product was purified by column chromatography using petroleum ether as eluent, to give colorless pure compound.

$^1$H-NMR(CDCl$_3$/TMS) δ (ppm): 0.06(s, 18H, 6CH$_3$), 0.89(d, 12H, 4CH$_3$), 1.12(d, 4H, 2CH$_2$), 1.69(m, 2H, 2CH), 3.30(s, 4H, 2—CH$_2$O—).

PREPARATION EXAMPLE 35

Preparation of 2,2-di-n-butyl-1,3-bis[(trimethylsilyl)oxy]propane

According to the procedure as described Preparation Example 34, 2,2-di-n-butyl-1,3-bis[(trimethylsilyl)oxy]propane was prepared from intermediate 2,2-di-n-butyl-1,3-propandiol and reagent trimethylsilyl chloride.

$^1$H-NMR(CDCl$_3$/TMS) δ (ppm): 0.06(s, 18H, 6CH$_3$), 0.89(t, 6H, 2CH$_3$), 1.14(m, 8H, 4CH$_2$), 1.23(t, 4H, 2CH$_2$), 3.27(s, 4H, 2CH$_2$O)

PREPARATION EXAMPLE 36

Preparation of 2,2-di-n-propyl-1,3-bis[(trimethylsilyl)oxy]-propane

According to the procedure as described Preparation Example 34, 2,2-di-n-propyl-1,3-bis[(trimethylsilyl)oxy]propane was prepared from intermediate 2,2-di-n-propyl-1,3-propandiol and reagent trimethylsilyl chloride.

$^1$H-NMR(CDCl$_3$/TMS) δ (ppm): 0.05(s, 18H, 6CH$_3$), 0.86(t, 6H, 2CH$_3$), 1.08(m, 4H, 2CH$_2$), 1.19(t, 4H, 2CH$_2$), 3.27(s, 4H, 2CH$_2$O)

PREPARATION EXAMPLE 37

Preparation of 1,1-bis[(trimethylsilyl)oxymethyl]-cyclohexane

According to the procedure as described Preparation Example 34, 1,1-bis[(trimethylsilyl)oxymethyl]cyclohexane was prepared from intermediate 1,1-bis(hydroxymethyl)cyclohexane and reagent trimethylsilyl chloride.

$^1$H-NMR(CDCl$_3$/TMS) δ (ppm): 0.08(s, 18H, 6CH$_3$), 1.20(s, 4H, 2CH$_2$), 1.40(s, 6H, 3CH$_2$), 3.42(s, 4H, 2CH$_2$O)

PREPARATION EXAMPLE 38

Preparation of 1,1-bis[(trimethylsilyl)oxymethyl]-cyclopentane

According to the procedure as described Preparation Example 34, 1,1-bis[(trimethylsilyl)oxymethyl]cyclopentane was prepared from intermediate 1,1-bis(hydroxymethyl)cyclopentane and reagent trimethylsilyl chloride.

$^1$H-NMR(CDCl$_3$/TMS) δ (ppm): 0.07(s, 18H, 6CH$_3$), 1.30(m, 4H, 2CH$_2$), 1.52(m, 4H, 2CH$_2$), 3.33(s, 4H, 2CH$_2$O)

EXAMPLES 1-38 AND COMPARATIVE EXAMPLE 1

Propylene Polymerization Experiments

Preparation of the Solid Titanium-Containing Catalyst Component

To a reactor that had been completely purged with N$_2$ were added successively 4.8 g of magnesium chloride, 95 ml of toluene, 4 ml of epichlorohydrin, and 12.5 ml of tributyl phosphate. With stirring, the mixture was heated to 50° C. and held at the temperature for 2.5 hours, thereby the solid was dissolved completely. Then 1.4 g of phthalic anhydride was added thereto and the reaction mixture was held at that temperature with stirring for further one hour. The reaction mixture was cooled to below −25° C. and 56 ml of TiCl$_4$ was added dropwise thereto over one hour, then the temperature was increased slowly to 80° C. Solid precipitated gradually during the heating. To the system were added 6 mmol of di-n-butyl phthalate, and the reaction was held at the temperature with stirring for further one hour. After removing the supernatant, to the residue was added 70 ml of toluene and the supernatant was removed again after mixing completely. The washing procedure was repeated twice. The resulting solid precipitate was treated with 60 ml of toluene and 40 ml of TiCl$_4$ at 100° C. for 2 hours, and after removing the supernatant, the residue was treated with 60 ml of toluene and 40 ml of TiCl$_4$ at 100° C. for 2 hours again. After removing the supernatant, the residue was washed with 60 ml toluene under boiling state for three times, washed with 60 ml hexane under boiling state for two times, washed with 60 ml hexane at room temperature for two times, to yield the solid titanium-containing catalyst component.

Examples 1-38 utilize, respectively, the silicon ether compounds as prepared in above Preparation Examples 1-38 as external electron donor, and Comparative Example 1 utilizes methylcyclohexyldimethoxysilane as external electron donor, in the propylene polymerization experiment carried out according to the following procedure.

To a 5 L stainless steel autoclave, which had been replaced with propylene gas completely, were added 2.5 mmol AlEt$_3$, 0.1 mmol said silicon ether compounds used as external electron donor, about 10 mg of the solid titanium-containing catalyst component prepared above, and 1 L of hydrogen, followed by introduction of 2.3 L of liquid propylene. The reactor was heated to 70° C., and the polymerization was performed at that temperature for one hour. After the temperature was reduced and the pressure was relieved, PP powder was removed.

Polymerization results were summarized in Tables 1-4.

TABLE 1

| xample No. | Silicon Ether Compound | Polymerization Activity kgPP/gcat · h | Isotacticity % | MI |
|---|---|---|---|---|
| Example 1 | 9-methoxymethyl-9-[(trimethylsilyl)oxymethyl]-fluorene | 30.6 | 96.8 | 4.0 |
| Example 2 | 9-methoxymethyl-9-(ethyldimethylsilyl)oxymethyl-fluorene | 14 | 91.3 | 3.6 |
| Example 3 | 9-methoxymethyl-9-(n-butyldimethylsilyl)oxymethyl-fluorene | 32 | 90.6 | 9.5 |
| Example 4 | 9-methoxymethyl-9-[(dimethylphenylsilyl)oxymethyl]-fluorene | 24.0 | 91.5 | 2.9 |
| Example 5 | 9-methoxymethyl-9-[(triethylsilyl)oxymethyl]-fluorene | 29.7 | 97.8 | 2.4 |
| Example 6 | 9-methoxymethyl-9-(benzyldimethylsilyl)oxymethyl-fluorene | 5.4 | 91.6 | 7.7 |
| Example 7 | 9-ethoxymethyl-9-[(trimethylsilyl)oxymethyl]-fluorene | 31.0 | 98.5 | 5.6 |
| Example 8 | 9-methoxymethyl-9-[(tert-butyldimethylsilyl)oxymethyl]-fluorene | 27.8 | 98.1 | 3.2 |

TABLE 2

| xample No. | Silicon Ether Compound | Polymerization Activity kgPP/gcat · h | Isotacticity % | MI |
|---|---|---|---|---|
| Example 9 | 9,9-bis[(trimethylsilyl)oxymethyl]-fluorene | 25.1 | 96.4 | 4.3 |
| Example 10 | 9,9-bis[(ethyldimethylsilyl)oxymethyl]-fluorene | 13.4 | 93.1 | 4.5 |
| Example 11* | 9,9-bis[(n-butyldimethylsilyl)oxymethyl]-fluorene | — | — | — |
| Example 12 | 9,9-bis[(dimethylphenylsilyl)oxymethyl]-fluorene | 19.5 | 88.4 | 6.4 |
| Example 13 | 9,9-bis[(triethylsilyl)oxymethyl]-fluorene | 28.7 | 85.8 | 11.9 |
| Example 14 | 9,9-bis[(benzyldimethylsilyl)oxymethyl]-fluorene | 15.8 | 80.0 | 14.5 |
| Example 15 | 9,9-bis[(tert-butyldimethylsilyl)oxymethyl]-fluorene | 19.4 | 63.6 | 23.3 |

*Polymer sticks to the polymerization reactor.

TABLE 3

| xample No. | Silicon Ether Compound | Polymerization Activity kgPP/gcat · h | Isotacticity % | MI |
|---|---|---|---|---|
| Example 16 | 2,2-dimethyl-1-methoxy-3-[(trimethylsilyl)oxy]propane | 27.7 | 96.7 | 2.6 |
| Example 17 | 2,2-dimethyl-1-methoxy-3-[(ethyldimethylsilyl)oxy]propane | 7.5 | 66.4 | 28.3 |
| Example 18 | 2,2-dimethyl-1-methoxy-3-[(tert-butyldimethylsilyl)oxy]propane | 38.3 | 98.4 | 5.8 |
| Example 19 | 2,2-dimethyl-1-methoxy-3-[(dimethylphenylsilyl)oxy]propane | 19.0 | 61.3 | 14.5 |
| Example 20 | 2,2-dimethyl-1-methoxy-3-[(triethylsilyl)oxy]propane | 41.8 | 97.9 | 6.9 |
| Example 21 | 2,2-dibenzyl-1-methoxy-3-[(trimethylsilyl)oxy]propane | 6.0 | 72.8 | 16.4 |
| Example 22 | 2,2-dibenzyl-1-methoxy-3-[(tert-butyldimethylsilyl)oxy]propane | 22 | 96.9 | 3.0 |
| Example 23 | 2,2-diisobutyl-1-methoxy-3-[(trimethylsilyl)oxy]propane | 3.3 | 88.4 | 8.7 |
| Example 24 | 2,2-di-n-butyl-1-methoxy-3-[(trimethylsilyl)oxy]propane | 32.5 | 96.3 | 5.1 |
| Example 25 | 2,2-di-n-butyl-1-methoxy-3-[(tert-butyldimethylsilyl)oxy]propane | 33.7 | 96.3 | 4.6 |
| Example 26 | 2,2-di-n-butyl-1-methoxy-3-[(triethylsilyl)oxy]propane | 35.6 | 96.8 | 6.2 |
| Example 27 | 2,2-di-n-propyl-1-methoxy-3-[(trimethylsilyl)oxy]propane | 25.5 | 96.4 | 5.2 |

TABLE 4

| Example No. | Silicon Ether Compound | Polymerization Activity kgPP/gcat · h | Isotacticity % | MI |
|---|---|---|---|---|
| Example 28 | 2,2-dimethyl-1,3-bis[(trimethylsilyl)oxy]propane | 31.5 | 97.0 | 3.5 |
| Example 29 | 2,2-dimethyl-1,3-bis[(ethyldimethylsilyl)oxy]propane | 34.6 | 98.4 | 4.7 |
| Example 30 | 2,2-dimethyl-1,3-bis[(tert-butyldimethylsilyl)oxy]propane | 16.5 | 59.7 | 29.9 |
| Example 31 | 2,2-dimethyl-1,3-bis[(dimethylphenylsilyl)oxy]propane | 27.7 | 85.3 | 7.8 |
| Example 32 | 2,2-dimethyl-1,3-bis[(triethylsilyl)oxy]propane | 11.9 | 73.3 | 10.4 |
| Example 33 | 2,2-dibenzyl-1,3-bis[(trimethylsilyl)oxy]propane | 23 | 80.7 | 12.0 |
| Example 34 | 2,2-diisobutyl-1,3-bis[(trimethylsilyl)oxy]propane | 34 | 96.2 | 3.8 |
| Example 35 | 2,2-di-n-butyl-1,3-bis[(trimethylsilyl)oxy]propane | 30.0 | 90.2 | 11.3 |
| Example 36 | 2,2-di-n-propyl-1,3-bis[(trimethylsilyl)oxy]propane | 16.2 | 74.7 | 22.1 |
| Example 37 | 1,1-bis[(trimethylsilyl)oxymethyl]cyclohexane | 25.5 | 96.2 | 4.1 |
| Example 38 | 1,1-bis[(trimethylsilyl)oxymethyl]cyclopentane | 30.0 | 91.5 | 6.1 |
| Comparative Example 1 | cyclohexylmethyldimethoxysilane | 34.8 | 98.3 | 3.2 |

EXAMPLES 39-40 AND COMPARATIVE EXAMPLE 2

Propylene Polymerization Experiment

Examples 39 and 40 utilize, respectively, the silicon ether compounds as prepared in above Preparation Examples 7 and 18 as external electron donor, and Comparative Example 2 utilizes methylcyclohexyldimethoxysilane as external electron donor in the propylene polymerization experiment carried out according to the same polymerization procedure as described in Examples 1-38, except for that the amount of hydrogen gas was changed to 4 L. Polymerization results were summarized in Table 5. For comparison, the results obtained in Examples 7 and 18 as well as in Comparative Example 1 were also shown in Table 5.

TABLE 5

| Example No. | External Electron Donor | $H_2$ (L) | Polymerization Activity (kgPP/gcat · h) | Isotacticity % | MI |
|---|---|---|---|---|---|
| Example 7 | 9-(ethoxymethyl)-9-[(trimethylsilyl)oxymethyl]-fluorene | 1 | 31.0 | 98.5 | 5.6 |
| Example 39 | " | 4 | 47.7 | 97.3 | 26.6 |
| Example 18 | 2,2-dimethyl-1-methoxy-3-[(tert-butyldimethylsilyl)oxy]propane | 1 | 38.3 | 98.4 | 5.8 |
| Example 40 | " | 4 | 47.0 | 97.2 | 27.5 |
| Comparative Example 1 | cyclohexylmethyldimethoxysilane | 1 | 34.8 | 98.3 | 3.2 |
| Comparative Example 2 | " | 4 | 44.6 | 97.8 | 19.2 |

It can be seen from the data given in Table 5 that, at the same hydrogen gas level, the polymerization using the silicon ether compounds according to the invention as external electron donor will give polymers having higher melt index than the polymerization using the silane compound commonly used in the art as external electron donor. As the level of hydrogen gas increases, melt index increases more notably. This performance facilitates the development of various grades of polymers.

Although the present invention has been described in connection with embodiments and examples, further modifications and alternative embodiments of various aspects of the invention will be apparent to those skilled in the art in view of this description. Accordingly, this description is to be constructed as illustrative only and is for the purpose of teaching the general manner of carrying out the invention. Additionally, all cited documents are wholly incorporated into this description by reference.

What is claimed is:

1. A catalyst for olefin polymerization, comprising a product of the following components:
   (A) solid titanium-containing catalyst component comprising magnesium, titanium and halogen as essential components;
   (B) organo-aluminum compound catalyst component, and
   (C) silicon ether compound catalyst component, the silicon ether compound being represented by a general formula (I):

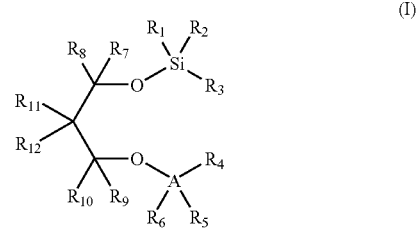

wherein
   $R_1$-$R_{12}$ groups, which are identical to or different from each other, represent hydrogen, halogen, $C_1$-$C_{20}$ linear or branched alkyl, $C_3$-$C_{20}$ cycloalkyl, $C_6$-$C_{20}$ aryl, $C_7$-$C_{20}$ alkaryl or $C_7$-$C_{20}$ aralkyl, and two or more of $R_1$-$R_{10}$ groups can be linked to form saturated or unsaturated ring structure(s), which is/are optionally substituted by a group having the same meanings as that of the $R_1$-$R_{12}$ groups, and wherein the $R_{11}$ and $R_{12}$ groups are not linked together to form a ring structure, or are linked together to form a saturated ring structure; the $R_1$-$R_{12}$ groups optionally contain one or more hetero-atoms selected from the group consisting of nitrogen, oxygen, sulfur, silicon, phosphorus and halogen atom for replacing carbon atom(s), hydrogen atom(s) or the both; and A represents a carbon atom or silicon atom.

2. The catalyst for olefin polymerization according to claim 1, wherein in the formula (I) of the silicon ether compound, the $R_1$-$R_{10}$ groups are identical to or different from each other, and represent hydrogen, halogen, $C_1$-$C_{10}$ linear or branched alkyl, or $C_6$-$C_{10}$ aryl.

3. The catalyst for olefin polymerization according to claim 1, wherein in the formula (I) of the silicon ether compound, A represents a carbon atom, $R_1$-$R_3$, which are identical to or different from each other, represent methyl, ethyl, n-propyl, iso-propyl, n-butyl, tert-butyl or phenyl, $R_4$-$R_6$, which are identical to or different from each other, represent hydrogen, methyl, ethyl, n-propyl, iso-propyl, n-butyl, or tert-butyl, and $R_7$-$R_{10}$ and R' are hydrogen.

4. The catalyst for olefin polymerization according to claim 1, wherein in the formula (I) of the silicon ether compound, A represents a silicon atom, $R_1$-$R_6$, which are identical to or different from each other, represent methyl, ethyl, n-propyl, iso-propyl, n-butyl, tert-butyl or phenyl, and $R_7$-$R_{10}$ and R' are hydrogen.

5. The catalyst for olefin polymerization according to claim 1, wherein in the general formula (I), $R_{11}$ and $R_{12}$ groups represent independently $C_1$-$C_{20}$ linear or branched alkyl, $C_6$-$C_{20}$ aryl, $C_7$-$C_{20}$ alkaryl or $C_7$-$C_{20}$ aralkyl group.

6. The catalyst for olefin polymerization according to claim 5, wherein in the formula (I) of the silicon ether compound, $R_1$-$R_{10}$ groups are identical to or different from each other, and represent hydrogen, halogen, $C_1$-$C_{10}$ linear or branched alkyl, or $C_6$-$C_{10}$ aryl.

7. The catalyst for olefin polymerization according to claim 6, wherein in the formula (I) of the silicon ether compound, A represents carbon atom, $R_1$-$R_3$, which are identical to or different from each other, represent methyl, ethyl, n-propyl, iso-propyl, n-butyl, tert-butyl or phenyl, $R_4$-$R_6$, which are identical to or different from each other, represent hydrogen, methyl, ethyl, n-propyl, iso-propyl, n-butyl, tert-butyl or phenyl, and $R_7$-$R_{10}$ and R' are hydrogen.

8. The catalyst for olefin polymerization according to claim 6, wherein in the formula (I) of the silicon ether compound, A represents silicon atom, $R_1$-$R_6$, which are identical to or different from each other, represent methyl, ethyl, n-propyl, iso-propyl, n-butyl, tert-butyl or phenyl, and $R_7$-$R_{10}$ and R' are hydrogen.

9. A process for olefin polymerization, comprising contacting an olefin having a formula of $CH_2=CHR$, in which R is hydrogen or $C_1$-$C_6$ alkyl or aryl, and optionally an alpha olefin comonomer having from 2 to 20 carbon atoms with the catalyst according to claim 6 under polymerization conditions.

10. A process for olefin polymerization, comprising contacting an olefin having a formula of $CH_2=CHR$, in which R is hydrogen or $C_1$-$C_6$ alkyl or aryl, and optionally an alpha olefin comonomer having from 2 to 20 carbon atoms with the catalyst according to claim 6 under polymerization conditions.

11. A process for propylene polymerization, comprising contacting propylene and optionally an alpha olefin comonomer having from 2 to 20 carbon atoms with the catalyst according to claim 5 under polymerization conditions.

12. The catalyst for olefin polymerization according to claim 1, wherein the silicon ether compound is selected from the group consisting of 2,2-dimethyl-1-methoxy-3-[(trimethylsilyl)oxy]propane;
2,2-dimethyl-1-methoxy-3-[(triethylsilyl)oxy]propane;
2,2-dimethyl-1-methoxy-3-[(triphenylsilyl)oxy]propane;
2,2-dimethyl-1-methoxy-3-[(ethyldimethylsilyl)oxy]propane;
2,2-dimethyl-1-methoxy-3-[(dimethylpropylsilyl)oxy]propane;
2,2-dimethyl-1-methoxy-3-[(tert-butyldimethylsilyl)oxy]propane;
2,2-dimethyl-1-methoxy-3-[(n-butyldimethylsilyl)oxy]propane;
2,2-dimethyl-1-methoxy-3-[(benzyldimethylsilyl)oxy]propane;
2,2-dimethyl-1-methoxy-3-[(dimethylphenethylsilyl)oxy]propane;
2,2-dimethyl-1-methoxy-3-[(dimethylphenylsilyl)oxy]propane;
2,2-dimethyl-1-methoxy-3-[(dimethyltolylsilyl)oxy]propane;
2,2-dimethyl-1-ethoxy-3-[(trimethylsilyl)oxy]propane;
2,2-dimethyl-1-ethoxy-3-[(triethylsilyl)oxy]propane;
2,2-dimethyl-1-ethoxy-3-[(triphenylsilyl)oxy]propane;
2,2-dimethyl-1-ethoxy-3-[(ethyldimethylsilyl)oxy]propane;
2,2-dimethyl-1-ethoxy-3-[(dimethylpropylsilyl)oxy]propane;
2,2-dimethyl-1-ethoxy-3-[(tert-butyldimethylsilyl)oxy]propane;
2,2-dimethyl-1-ethoxy-3-[(n-butyldimethylsilyl)oxy]propane;
2,2-dimethyl-1-ethoxy-3-[(benzyldimethylsilyl)oxy]propane;
2,2-dimethyl-1-ethoxy-3-[(dimethylphenethylsilyl)oxy]propane;
2,2-dimethyl-1-ethoxy-3-[(dimethylphenylsilyl)oxy]propane;
2,2-dimethyl-1-ethoxy-3-[(dimethyltolylsilyl)oxy]propane;
2,2-dimethyl-1-propoxy-3-[(trimethylsilyl)oxy]propane;
2,2-dimethyl-1-propoxy-3-[(triethylsilyl)oxy]propane;
2,2-dimethyl-1-propoxy-3-[(triphenylsilyl)oxy]propane;
2,2-dimethyl-1-propoxy-3-[(ethyldimethylsilyl)oxy]propane;
2,2-dimethyl-1-propoxy-3-[(dimethylpropylsilyl)oxy]propane;
2,2-dimethyl-1-propoxy-3-[(tert-butyldimethylsilyl)oxy]propane;
2,2-dimethyl-1-propoxy-3-[(n-butyldimethylsilyl)oxy]propane;
2,2-dimethyl-1-propoxy-3-[(benzyldimethylsilyl)oxy]propane;
2,2-dimethyl-1-propoxy-3-[(dimethylphenethylsilyl)oxy]propane;
2,2-dimethyl-1-propoxy-3-[(dimethylphenylsilyl)oxy]propane;
2,2-dimethyl-1-propoxy-3-[(dimethyltolylsilyl)oxy]propane;

2,2-di-n-propyl-1-methoxy-3-[(trimethylsilyl)oxy]propane;
2,2-di-iso-butyl-1-methoxy-3-[(trimethylsilyl)oxy]propane;
2,2-di-iso-butyl-1-methoxy-3-[(triethylsilyl)oxy]propane;
2,2-di-iso-butyl-1-methoxy-3-[(triphenylsilyl)oxy]propane;
2,2-di-iso-butyl-1-methoxy-3-[(ethyldimethylsilyl)oxy]propane;
2,2-di-iso-butyl-1-methoxy-3-[(dimethylpropylsilyl)oxy]propane;
2,2-di-iso-butyl-1-methoxy-3-[(tert-butyldimethylsilyl)oxy]propane;
2,2-di-iso-butyl-1-methoxy-3-[(n-butyldimethylsilyl)oxy]propane;
2,2-di-iso-butyl-1-methoxy-3-[(benzyldimethylsilyl)oxy]propane;
2,2-di-iso-butyl-1-methoxy-3-[(dimethylphenethylsilyl)oxy]propane;
2,2-di-iso-butyl-1-methoxy-3-[(dimethylphenylsilyl)oxy]propane;
2,2-di-iso-butyl-1-methoxy-3-[(dimethyltolylsilyl)oxy]propane;
2,2-di-n-butyl-1-methoxy-3-[(trimethylsilyl)oxy]propane;
2,2-di-n-butyl-1-methoxy-3-[(triethylsilyl)oxy]propane;
2,2-di-n-butyl-1-methoxy-3-[(triphenylsilyl)oxy]propane;
2,2-di-n-butyl-1-methoxy-3-[(ethyldimethylsilyl)oxy]propane;
2,2-di-n-butyl-1-methoxy-3-[(dimethylpropylsilyl)oxy]propane;
2,2-di-n-butyl-1-methoxy-3-[(tert-butyldimethylsilyl)oxy]propane;
2,2-di-n-butyl-1-methoxy-3-[(n-butyldimethylsilyl)oxy]propane;
2,2-di-n-butyl-1-methoxy-3-[(benzyldimethylsilyl)oxy]propane;
2,2-di-n-butyl-1-methoxy-3-[(dimethylphenethylsilyl)oxy]propane;
2,2-di-n-butyl-1-methoxy-3-[(dimethylphenylsilyl)oxy]propane;
2,2-di-n-butyl-1-methoxy-3-[(dimethyltolylsilyl)oxy]propane;
2,2-di-iso-butyl-1-ethoxy-3-[(trimethylsilyl)oxy]propane;
2,2-di-iso-butyl-1-ethoxy-3-[(triethylsilyl)oxy]propane;
2,2-di-iso-butyl-1-ethoxy-3-[(triphenylsilyl)oxy]propane;
2,2-di-iso-butyl-1-ethoxy-3-[(ethyldimethylsilyl)oxy]propane;
2,2-di-iso-butyl-1-ethoxy-3-[(dimethylpropylsilyl)oxy]propane;
2,2-di-iso-butyl-1-ethoxy-3-[(tert-butyldimethylsilyl)oxy]propane;
2,2-di-iso-butyl-1-ethoxy-3-[(n-butyldimethylsilyl)oxy]propane;
2,2-di-iso-butyl-1-ethoxy-3-[(benzyldimethylsilyl)oxy]propane;
2,2-di-iso-butyl-1-ethoxy-3-[(dimethylphenethylsilyl)oxy]propane;
2,2-di-iso-butyl-1-ethoxy-3-[(dimethylphenylsilyl)oxy]propane;
2,2-di-iso-butyl-1-ethoxy-3-[(dimethyltolylsilyl)oxy]propane;
2,2-di-iso-butyl-1-propoxy-3-[(trimethylsilyl)oxy]propane;
2,2-di-iso-butyl-1-propoxy-3-[(triethylsilyl)oxy]propane;
2,2-di-iso-butyl-1-propoxy-3-[(triphenylsilyl)oxy]propane;
2,2-di-iso-butyl-1-propoxy-3-[(ethyldimethylsilyl)oxy]propane;
2,2-di-iso-butyl-1-propoxy-3-[(dimethylpropylsilyl)oxy]propane;
2,2-di-iso-butyl-1-propoxy-3-[(tert-butyldimethylsilyl)oxy]propane;
2,2-di-iso-butyl-1-propoxy-3-[(n-butyldimethylsilyl)oxy]propane;
2,2-di-iso-butyl-1-propoxy-3-[(benzyldimethylsilyl)oxy]propane;
2,2-di-iso-butyl-1-propoxy-3-[(dimethylphenethylsilyl)oxy]propane;
2,2-di-iso-butyl-1-propoxy-3-[(dimethylphenylsilyl)oxy]propane;
2,2-di-iso-butyl-1-propoxy-3-[(dimethyltolylsilyl)oxy]propane;
2,2-dibenzyl-1-methoxy-3-[(trimethylsilyl)oxy]propane;
2,2-dibenzyl-1-methoxy-3-[(triethylsilyl)oxy]propane;
2,2-dibenzyl-1-methoxy-3-[(triphenylsilyl)oxy]propane;
2,2-dibenzyl-1-methoxy-3-[(ethyldimethylsilyl)oxy]propane;
2,2-dibenzyl-1-methoxy-3-[(dimethylpropylsilyl)oxy]propane;
2,2-dibenzyl-1-methoxy-3-[(tert-butyldimethylsilyl)oxy]propane;
2,2-dibenzyl-1-methoxy-3-[(n-butyldimethylsilyl)oxy]propane;
2,2-dibenzyl-1-methoxy-3-[(benzyldimethylsilyl)oxy]propane;
2,2-dibenzyl-1-methoxy-3-[(dimethylphenethylsilyl)oxy]propane;
2,2-dibenzyl-1-methoxy-3-[(dimethylphenylsilyl)oxy]propane;
2,2-dibenzyl-1-methoxy-3-[(dimethyltolylsilyl)oxy]propane;
2,2-dibenzyl-1-ethoxy-3-[(trimethylsilyl)oxy]propane;
2,2-dibenzyl-1-ethoxy-3-[(triethylsilyl)oxy]propane;
2,2-dibenzyl-1-ethoxy-3-[(triphenylsilyl)oxy]propane;
2,2-dibenzyl-1-ethoxy-3-[(ethyldimethylsilyl)oxy]propane;
2,2-dibenzyl-1-ethoxy-3-[(dimethylpropylsilyl)oxy]propane;
2,2-dibenzyl-1-ethoxy-3-[(tert-butyldimethylsilyl)oxy]propane;
2,2-dibenzyl-1-ethoxy-3-[(n-butyldimethylsilyl)oxy]propane;
2,2-dibenzyl-1-ethoxy-3-[(benzyldimethylsilyl)oxy]propane;
2,2-dibenzyl-1-ethoxy-3-[(dimethylphenethylsilyl)oxy]propane;
2,2-dibenzyl-1-ethoxy-3-[(dimethylphenylsilyl)oxy]propane;
2,2-dibenzyl-1-ethoxy-3-[(dimethyltolylsilyl)oxy]propane;
2,2-dibenzyl-1-propoxy-3-[(trimethylsilyl)oxy]propane;
2,2-dibenzyl-1-propoxy-3-[(triethylsilyl)oxy]propane;
2,2-dibenzyl-1-propoxy-3-[(triphenylsilyl)oxy]propane;
2,2-dibenzyl-1-propoxy-3-[(ethyldimethylsilyl)oxy]propane;
2,2-dibenzyl-1-propoxy-3-[(dimethylpropylsilyl)oxy]propane;
2,2-dibenzyl-1-propoxy-3-[(tert-butyldimethylsilyl)oxy]propane;

2,2-dibenzyl-1-propoxy-3-[(n-butyldimethylsilyl)oxy]propane;
2,2-dibenzyl-1-propoxy-3-[(benzyldimethylsilyl)oxy]propane;
2,2-dibenzyl-1-propoxy-3-[(dimethylphenethylsilyl)oxy]propane;
2,2-dibenzyl-1-propoxy-3-[(dimethylphenylsilyl)oxy]propane;
2,2-dibenzyl-1-propoxy-3-[(dimethyltolylsilyl)oxy]propane;
2,2-dimethyl-1,3-bis[(trimethylsilyl)oxy]propane;
2,2-dimethyl-1,3-bis[(triethylsilyl)oxy]propane;
2,2-dimethyl-1,3-bis[(triphenylsilyl)oxy]propane;
2,2-dimethyl-1,3-bis[(ethyldimethylsilyl)oxy]propane;
2,2-dimethyl-1,3-bis[(dimethylpropylsilyl)oxy]propane;
2,2-dimethyl-1,3-bis[(tert-butyldimethylsilyl)oxy]propane;
2,2-dimethyl-1,3-bis[(n-butyldimethylsilyl)oxy]propane;
2,2-dimethyl-1,3-bis[(benzyldimethylsilyl)oxy]propane;
2,2-dimethyl-1,3-bis[(dimethylphenethylsilyl)oxy]propane;
2,2-dimethyl-1,3-bis[(dimethylphenylsilyl)oxy]propane;
2,2-dimethyl-1,3-bis[(dimethyltolylsilyl)oxy]propane;
2,2-di-n-butyl-1,3-bis[(trimethylsilyl)oxy]propane;
2,2-di-n-propyl-1,3-bis[(trimethylsilyl)oxy]propane;
1,1-bis[(trimethylsilyl)oxymethyl]cyclohexane;
1,1-bis[(trimethylsilyl)oxymethyl]cyclopentane;
2,2-di-iso-butyl-1,3-bis[(trimethylsilyl)oxy]propane;
2,2-di-iso-butyl-1,3-bis[(triethylsilyl)oxy]propane;
2,2-di-iso-butyl-1,3-bis[(triphenylsilyl)oxy]propane;
2,2-di-iso-butyl-1,3-bis[(ethyldimethylsilyl)oxy]propane;
2,2-di-iso-butyl-1,3-bis[(dimethylpropylsilyl)oxy]propane;
2,2-di-iso-butyl-1,3-bis[(tert-butyldimethylsilyl)oxy]propane;
2,2-di-iso-butyl-1,3-bis[(n-butyldimethylsilyl)oxy]propane;
2,2-di-iso-butyl-1,3-bis[(benzyldimethylsilyl)oxy]propane;
2,2-di-iso-butyl-1,3-bis[(dimethylphenethylsilyl)oxy]propane;
2,2-di-iso-butyl-1,3-bis[(dimethylphenylsilyl)oxy]propane;
2,2-di-iso-butyl-1,3-bis[(dimethyltolylsilyl)oxy]propane;
2,2-dibenzyl-1,3-bis[(trimethylsilyl)oxy]propane;
2,2-dibenzyl-1,3-bis[(triethylsilyl)oxy]propane;
2,2-dibenzyl-1,3-bis[(triphenylsilyl)oxy]propane;
2,2-dibenzyl-1,3-bis[(ethyldimethylsilyl)oxy]propane;
2,2-dibenzyl-1,3-bis[(dimethylpropylsilyl)oxy]propane;
2,2-dibenzyl-1,3-bis[(tert-butyldimethylsilyl)oxy]propane;
2,2-dibenzyl-1,3-bis[(n-butyldimethylsilyl)oxy]propane;
2,2-dibenzyl-1,3-bis[(benzyldimethylsilyl)oxy]propane;
2,2-dibenzyl-1,3-bis[(dimethylphenethylsilyl)oxy]propane;
2,2-dibenzyl-1,3-bis[(dimethylphenylsilyl)oxy]propane; and
2,2-dibenzyl-1,3-bis[(dimethyltolylsilyl)oxy]propane.

13. A process for olefin polymerization, comprising contacting an olefin having a formula of $CH_2=CHR$, in which R is hydrogen or $C_1$-$C_6$ alkyl or aryl, and optionally an alpha olefin comonomer having from 2 to 20 carbon atoms with the catalyst according to claim 1 under polymerization conditions.

14. A process for propylene polymerization, comprising contacting propylene and optionally an alpha olefin comonomer having from 2 to 20 carbon atoms with the catalyst according to claim 1 under polymerization conditions.

15. The catalyst according to claim 1, wherein the solid titanium-containing catalyst component is formed with an internal electron donor compound and, after formation of the solid titanium-containing catalyst component, the solid titanium-containing catalyst component is combined with the organo-aluminum compound catalyst component and the silicon ether compound catalyst component such that the silicon ether compound catalyst component acts as an external electron donor in the catalyst.

16. The catalyst according to claim 15, wherein the internal electron donor comprises a phthalate.

* * * * *